United States Patent
Emigh et al.

(10) Patent No.: US 8,892,673 B1
(45) Date of Patent: Nov. 18, 2014

(54) HYBRID CHALLENGE-RESPONSE

(75) Inventors: Aaron T. Emigh, Incline Village, NV (US); James A. Roskind, Redwood City, CA (US)

(73) Assignee: Radix Holdings, LLC, Incline Village, NV (US)

(*) Notice: Subject to any disclaimer, the term of this patent is extended or adjusted under 35 U.S.C. 154(b) by 947 days.

(21) Appl. No.: 10/914,908

(22) Filed: Aug. 9, 2004

Related U.S. Application Data

(60) Provisional application No. 60/493,991, filed on Aug. 8, 2003, provisional application No. 60/518,382, filed on Nov. 7, 2003, provisional application No. 60/524,107, filed on Nov. 22, 2003, provisional application No. 60/535,421, filed on Jan. 9, 2004.

(51) Int. Cl.
*G06F 15/16* (2006.01)

(52) U.S. Cl.
USPC ........................................... 709/207

(58) Field of Classification Search
USPC .................................. 709/206, 207
See application file for complete search history.

(56) References Cited

U.S. PATENT DOCUMENTS

| | | | |
|---|---|---|---|
| 5,377,354 A | 12/1994 | Scannell et al. | |
| 5,796,840 A | 8/1998 | Davis | |
| 5,930,479 A | 7/1999 | Hall | |
| 5,999,932 A | 12/1999 | Paul | |
| 5,999,967 A | 12/1999 | Sundsted | |
| 6,023,723 A | 2/2000 | McCormick et al. | |
| 6,052,709 A | 4/2000 | Paul | |
| 6,112,227 A | 8/2000 | Heiner | |
| 6,161,130 A * | 12/2000 | Horvitz et al. | 709/206 |
| 6,192,114 B1 | 2/2001 | Council | |
| 6,195,698 B1 | 2/2001 | Lillibridge et al. | |
| 6,199,102 B1 * | 3/2001 | Cobb | 709/206 |
| 6,249,805 B1 | 6/2001 | Fleming, III | |
| 6,266,692 B1 | 7/2001 | Greenstein | |
| 6,393,465 B2 | 5/2002 | Leeds | |
| 6,421,709 B1 | 7/2002 | McCormick et al. | |
| 6,473,758 B1 | 10/2002 | Schwartz et al. | |
| 6,484,197 B1 | 11/2002 | Donohue | |
| 6,546,416 B1 | 4/2003 | Kirsch | |
| 6,574,658 B1 | 6/2003 | Gabber et al. | |
| 6,587,550 B2 | 7/2003 | Council et al. | |
| 6,591,291 B1 | 7/2003 | Gabber et al. | |
| 6,633,855 B1 | 10/2003 | Auvenshine | |
| 7,076,527 B2 * | 7/2006 | Bellegarda et al. | 709/206 |
| 7,249,175 B1 * | 7/2007 | Donaldson | 709/225 |
| 2002/0116463 A1 * | 8/2002 | Hart | 709/206 |
| 2004/0073617 A1 * | 4/2004 | Milliken et al. | 709/206 |
| 2004/0249901 A1 * | 12/2004 | Wallace et al. | 709/207 |
| 2005/0081059 A1 * | 4/2005 | Bandini et al. | 713/201 |

OTHER PUBLICATIONS

Feng Zhou & Li Zhuang, "Approximate Text Addressing and Spam Filtering on P2P Systems." Dec. 13, 2002, http://oceanstore.cs.berkeley.edu/publications/talks/tahoe-2003-01/zf.ppt.

(Continued)

*Primary Examiner* — Sulaiman Nooristany

(57) ABSTRACT

In some embodiments, a technique for processing a message comprises receiving a message; classifying the message into one of a plurality of categories, wherein the classification includes using content-based message analysis; and challenging the message if the message is classified into a first category.

23 Claims, 30 Drawing Sheets

(56) References Cited

OTHER PUBLICATIONS

Eric Johanssen, "Antispam Systems Using Proof of Work Postage Stamps and Digital Signatures." Sep. 26, 2001, http://web.archive.org/web/20030621080213/www.camram.org/camram_intro.html.

Edward W. Felten, "Freedom to Tinker: A Challenging Response to Challenge-Response." May 19, 2003, http://www.freedom-to-tinker.com/index.php?p=389.

William S. Yerazunis, "Sparse Binary Polynomial Hashing and the CRM114 Discriminator." MIT Spam Conference 2003, Jan. 17, 2003, http://crm114.sourceforge.net/CRM114_slides_16.ppt.

Adam Back, "Hashcash—A Denial of Service Counter-Measure." Aug. 1, 2002, http://www.hashcash.org/papers/hashcash.pdf.

Adam Back, *Untitled Summary of Hashcash Status*. Sep. 1, 2003, http://www.cypherspace.org/hashcash/.

Cynthia Dwork & Moni Naor, "Pricing via Processing, or Combatting Junk Mail." Updated version of paper appearing in CRYPTO 92 Proceedings, vol. 740 of Lecture Notes in Computer Science, 1992. http://research.microsoft.com/research/sv/PennyBlack/junk1.pdf.

Scott E. Fahlman, Selling Interrupt Rights: A Way to Control Unwanted E-Mail and Telephone Calls. IBM Systems Journal, vol. 41, No. 4, 2002.

Cynthia Dwork, "Fighting Spam May Be Easier Than You Think." Date unknown (believed 2003), http://research.microsoft.com/research/sv/PennyBlack/demo/stanfordspam.ppt.

Andrew Birrell, Cynthia Dwork, Ted Wobber & Russell Impagliazzo, "Spam-Resistant Email." Presentation of Microsoft Research—Silicon Valley, Oct. 2001.

Mike Burrows, Cynthia Dwork & Andrew Goldberg, "No Spam at Any (CPU) Speed." 2003, http://research.microsoft.com/research/sv/PennyBlack/demo/TF2003.ppt.

Joel Spolsky, "Joel on Software: Bad Spam Filters." Nov. 14, 2002, http://www.joelonsoftware.com/news/20021114.html.

Thede Loder, Marshall Van Alstyne, & Rick Walsh, Information Asymmetry and Thwarting Spam. Jan. 14, 2004, http://www.ftc.gov/be/seminardocs/vanalstynespam.pdf.

Vincent Schiavone, David Brussin, James Koenig, Stephen Cobb & Ray Everett-Church, "Trusted Email Open Standard: A Comprehensive Policy and Technology Proposal for Email Reform." May 2003, ePrivacy Group Whitepaper, http://www.ftc.gov/bcp/workshops/spam/Supplements/eprivacygp.pdf.

Thorsten Joachims, "Text Categorization with Support Vector Machines: Learning with Many Relevant Features." Apr. 19, 1998, University of Dortmund LS-8 Report 23; London: Springer-Verlag, "Lecture Notes in Computer Science; vol. 1398: Proceedings of the 10th European Conference on Machine Learning," pp. 137-142.

Evan Harris, "The Next Step in the Spam Control War: Greylisting." 2003, http://projects.puremagic.com/greylisting/whitepaper.html.

Symantec Corporation, "Norton AntiSpam Key Features." 2004, http://web.archive.org/web/20040714045627/http://www.symantec.com/antispam/features.html.

Qurb, Inc. "Frequently Asked Questions." Aug. 2004, from web site of Qurb, Inc. No longer available online.

Brad Templeton, "E-Stamps." 2003, http://www.templetons.com/brad/spam/estamps.html.

* cited by examiner

```
From recipient@recipient.com  Wed Oct  1 14:50:40 2003
Return-Path: <recipient@recipient.com>
Received: from host97.ipowerweb.com (host97.ipowerweb.com
[12.129.229.197])
        by sender.com (8.12.5/8.12.5) with SMTP id h91LodHq019642
        for <sender@sender.com>; Wed, 1 Oct 2003 14:50:39 -0700 (PDT)
Received: (qmail 98241 invoked from network); 1 Oct 2003 21:51:09 -0000
Received: from unknown (HELO recipientmachine) (63.205.185.188)
   by 0 with SMTP; 1 Oct 2003 21:51:09 -0000
From: "Robert Recipient" <recipient@recipient.com>
To: "Steve Sender" <sender@sender.com>
Subject: RE: Hello! [CHALLENGE: B44FB6E3371BD10FAF758C9B6ABDD20C]
Date: Wed, 1 Oct 2003 14:49:15 -0700
Message-ID: <008501c38865$db7e0750$0300a8c0@recipientmachine>
MIME-Version: 1.0
Content-Type: text/plain;
        charset="iso-8859-1"
Content-Transfer-Encoding: 7bit
X-Priority: 3 (Normal)
X-MSMail-Priority: Normal
X-Mailer: Microsoft Outlook IMO, Build 9.0.2416 (9.0.2911.0)
In-Reply-To: <200310012137.h91Lb4e2019444@sender.com>
Importance: Normal
X-MimeOLE: Produced By Microsoft MimeOLE V6.00.2800.1106
X-Challenge: 200310012137.h91Lb4e2019444@sender.com, MD5Challenge, 3,
        100101110, CDE47EF73A184838340AAFCE4B402C97
X-Challenge-Address: recipient@recipient.com
Content-Length: 746
```

Due to the high volume of unsolicited email, your message titled "Hello!" has not yet been delivered. To release this message to recipient@recipient.com, please answer the attached question. This will deliver your message immediately, and automatically authorize all emails from you to this email address without any further inconvenience.

Please reply to this message, without changing the subject line. In the message body, please type the text you see below.

Thank you!

Yours,
Robert Recipient

NSP

You may download free software that will automatically respond to messages such as this one at http://www.radixpartners.com.

HYBRID CHALLENGE-RESPONSE

CROSS REFERENCE TO RELATED APPLICATIONS

This application claims priority to U.S. Provisional Patent Application No. 60/493,991 entitled SYSTEM AND METHOD FOR AVOIDING SPAM filed Aug. 8, 2003, which is incorporated herein by reference for all purposes.

This application claims priority to U.S. Provisional Patent Application No. 60/518,382, entitled ELECTRONIC MESSAGING ENHANCEMENTS filed Nov. 7, 2003, which is incorporated herein by reference for all purposes.

This application claims priority to U.S. Provisional Patent Application No. 60/524,107 entitled ADDITIONAL MESSAGING ENHANCEMENTS, filed Nov. 22, 2003, which is incorporated herein by reference for all purposes.

This application claims priority to U.S. Provisional Patent Application No. 60/535,421 entitled IMPLICIT SPAM DETECTION, filed Jan. 9, 2004, which is incorporated herein by reference for all purposes.

FIELD OF THE INVENTION

The present invention relates generally to the area of computer software, more specifically to the area of electronic messaging.

BACKGROUND OF THE INVENTION

Electronic communications such as email and instant messages are commonly used for personal and business communications. Unsolicited commercial electronic messages and other unwanted messages can inundate users. Such messages are commonly referred to as spam.

It would be useful to have improved techniques for mitigating the adverse effects of spam.

BRIEF DESCRIPTION OF THE DRAWINGS

Various embodiments of the invention are disclosed in the following detailed description and the accompanying drawings.

FIG. 17 shows an illustrative format for a challenge according to some embodiments.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Spam refers herein to any unwanted electronic message, including unsolicited commercial messages, deceptive or fraudulent messages such as phishing messages, and messages with forged information such as false return address. Electronic messages include email, instant messages, SMS text messages (e.g., on cellular telephones), pager messages, RSS messages, Atom messages, Bluetooth messages, and any other suitable electronic messages. For clarity, the present discussion sometimes refers to email messages rather than email messages and/or other types of electronic messages. Email messages are, however, merely one illustrative type of electronic communication.

Figure 1:
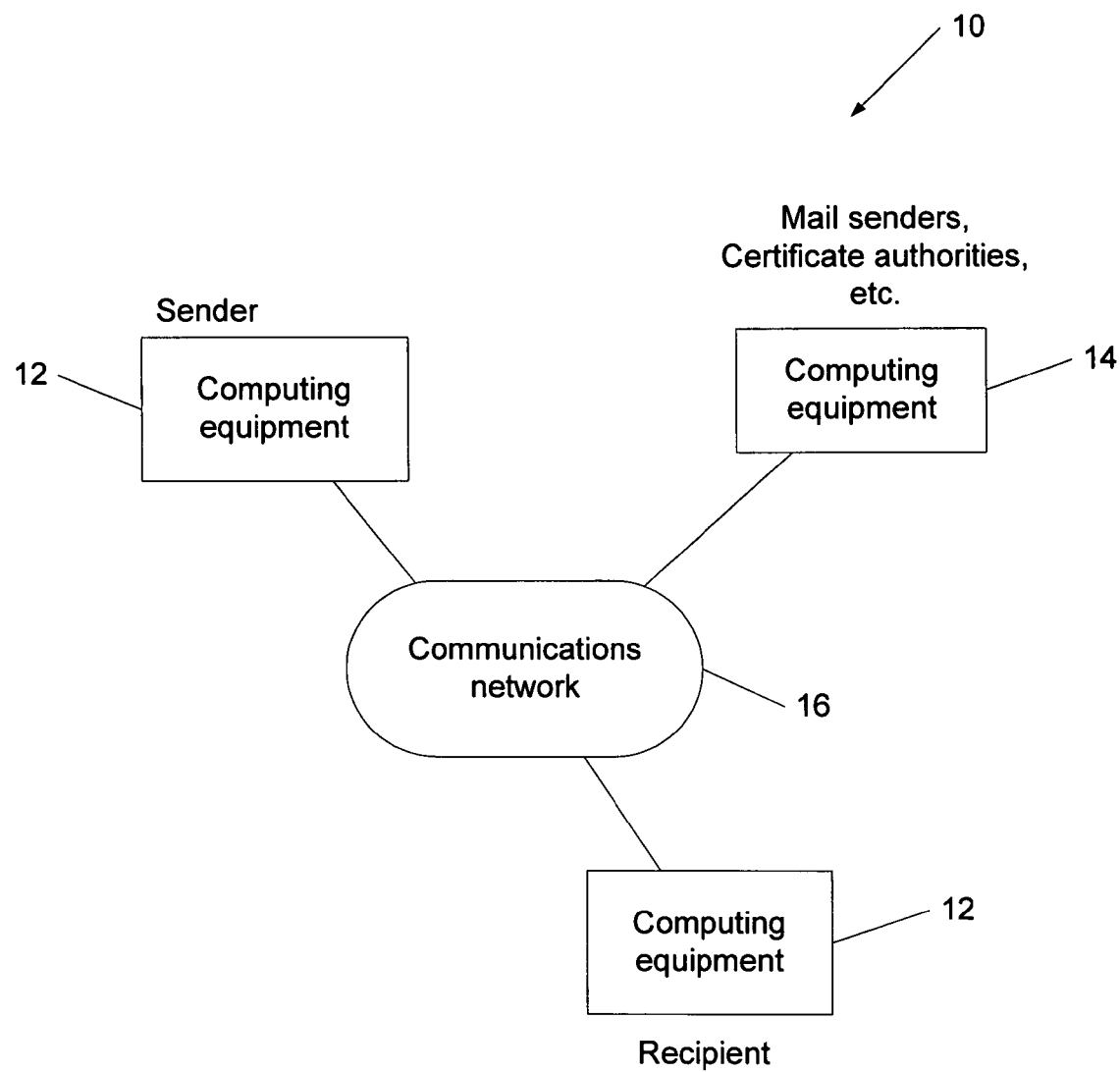
FIG. 1 is a diagram of an illustrative system for processing spam according to some embodiments.

FIG. 1 is a diagram of an illustrative system for processing spam according to some embodiments. In this example, in system 10 of FIG. 1, users at computing equipment 12 and other entities with computing equipment 14 may communicate over a communications network 16.

A user and/or associated equipment that participates in sending a message is herein referred to as a sender. A user and/or associated equipment involved in receiving a messages is herein referred to as a recipient. A given user may be a sender at one time and a recipient at another time. For clarity, a user who sends an original message to another user is herein referred to as a sender and the receiving user is referred to as a recipient, even though the sender may also receive messages such as challenges and other replies back from the recipient in response to the original message.

User activities in system 10 may sometimes involve manual intervention. Mail distribution and other functions such as user authentication and user support services may be automated and/or handled manually using, for example, equipment 14 (e.g., equipment associated with mail servers, equipment associated with certificate authorities, or equipment associated with other entities). The terms used for the entities in system 10 such as "sender," "recipient," "user," etc. are therefore used to describe both people and their equipment in the following discussion.

Equipment 12 and equipment 14 may, for example, include computing equipment such as a portable computers, personal computers, workstations, mainframe computers, networked computers or terminals such as computer terminals that are connected to the Internet using a host computer in a local area network, handheld computers (including wireless email devices), cellular phones, or any other suitable electronic equipment. Each user's equipment may include one or more computers or other electronic equipment which may be co-located or located at one or more separate geographic locations. For example, one user's computing equipment may be based on a personal computer located at the user's office. Another user (e.g., a corporation) may have many computers distributed over a wide geographic area that are linked through a wide area network. These are merely illustrative examples. Any suitable arrangement may be used for the computing equipment in system 10 to support electronic communications and anti-spam capabilities.

The equipment of FIG. 1 may be interconnected by communications paths in communications network 16. Network 16 may include the internet and other wide area networks, local area networks, virtual private networks, networks based on wired or wireless paths, networks including optical paths, networks based on the public switched telephone network, or networks formed using any other suitable network technology.

Anti-spam functions can be supported in system 10 using a combination of hardware and software. In a typical arrangement, software such as a messaging application (e.g., an email client) and optional associated plug-ins are installed on each user's computing equipment. Anti-spam software may also be installed in a more distributed fashion (e.g., by placing some or all of the appropriate software components for the system on the computing equipment of entities such as internet service providers, gateways and mail transfer agents associated with organizations, third-party mail servers on the internet, etc.). Anti-spam software may therefore be run on end user equipment (e.g., the equipment of an organization or home user that is originating or accepting messages or that is intended as the ultimate recipient of message) and on equipment in system 10 that is associated with entities that are typically located at intermediate locations in system 10 such as mail transfer agents, internet service providers, etc. In certain embodiments, these intermediate entities serve as users who originate and receive messages. As an example, an internet service provider with anti-spam capabilities serves as an intermediate recipient of the email destined for its customers (who are the ultimate downstream recipients of these emails after the internet service provider has filtered out spam).

Figure 2:
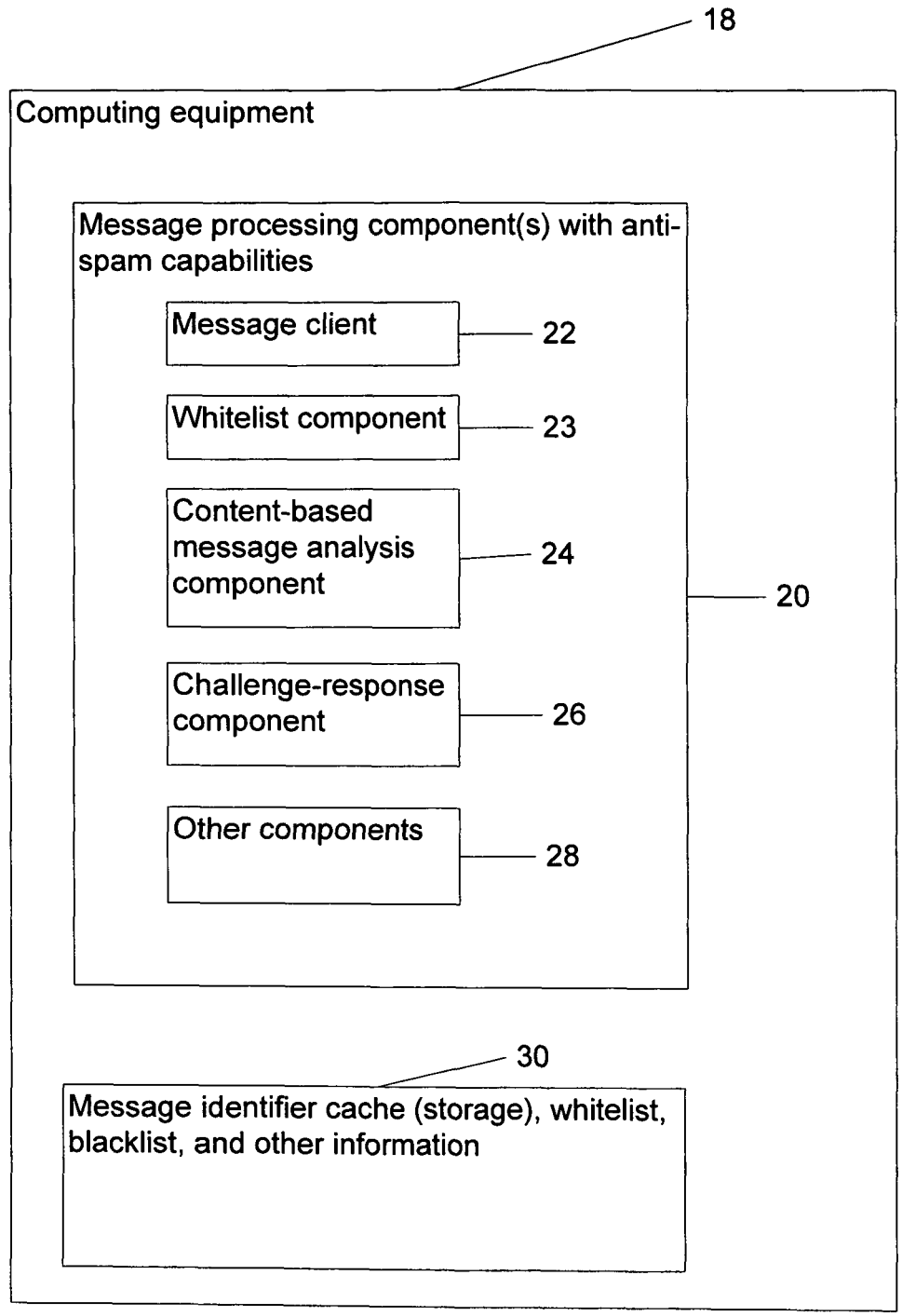
FIG. 2 is a diagram of illustrative computing equipment with anti-spam capabilities according to some embodiments.

FIG. 2 is a diagram of illustrative computing equipment with anti-spam capabilities according to some embodiments. In this example, equipment 18 has one or more messaging processing software components 20 with anti-spam capabilities. Components 20 may be any suitable software (e.g., stand-alone software programs, plug-ins or modules, libraries, etc.). For example, components 20 may include a messaging client 22 such as an email or instant messaging client. The client 22 may be updated when desired using plug-ins or other upgrades to provide or enhance its anti-spam capabilities. A whitelist component 23 may be used to filter messages based on their senders and/or recipients. A content-based message analysis component 24 may analyze messages and classify messages as being potential spam. Content-based message analysis refers herein to any component that classifies messages as being legitimate or as being potential spam based on analysis of the message contents. One of the ways content-based message analysis is distinguishable from a whitelist is that its analysis is more complex than data lookup as may be employed by a whitelist. Examples of content-based message analysis components include text classifiers such as Bayesian classifiers, support vector machines, etc. Challenge-response component 26 may be used to handle challenge-response functions such as generating challenges to some or all incoming messages, facilitating the generation and transmission of responses to challenge messages, etc. Other components 28 may be used to provide other anti-spam and messaging functions. The components 20 may use storage on computing equipment 18 to maintain a message identifier cache, a whitelist (e.g., a list of authorized senders), a blacklist (e.g., a list of known spammers), and other information 30. Information 30 may be stored on the same computing equipment 18 as one or all of components 20, may be stored on remote equipment, or may be stored in a distributed fashion at one or more local and/or remote locations.

Figure 3:
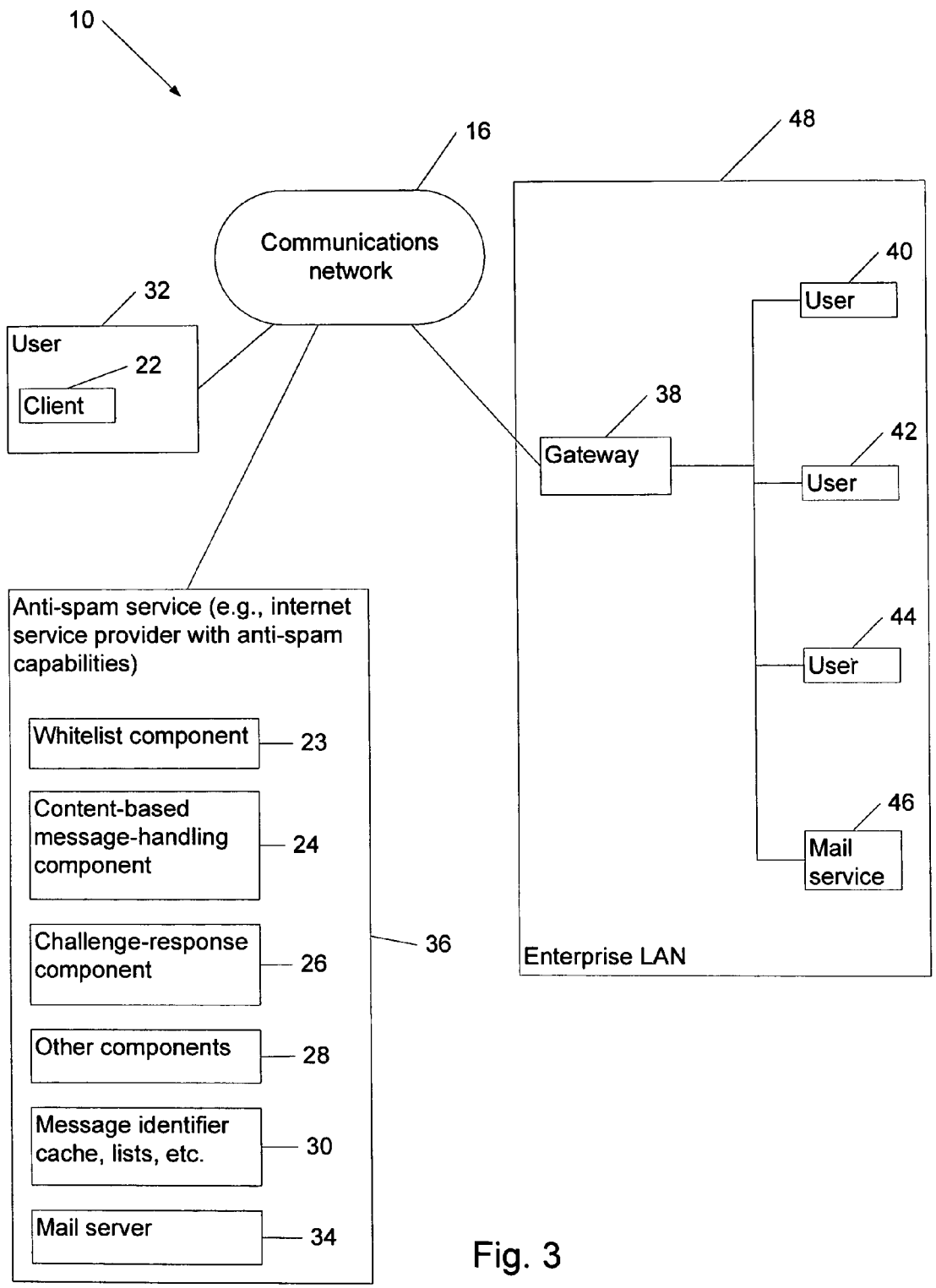
FIG. 3 is a diagram of an illustrative system for processing spam according to some embodiments.

FIG. 3 is a diagram of an illustrative system for processing spam according to some embodiments. In this example, a user 32 has client software 22 (e.g., a messaging application and optional associated plug-ins) that allows the user to communicate with anti-spam service 36 over communications network 16. Electronic messages that are sent to and from user 32 may be processed by anti-spam service 36 using one or more of whitelist component 23, content-based message analysis component 24, challenge-response component 26, and other components 28. A mail server (for example a mail transfer agent) 34 may be used in the transmission and reception of messages over network 16. Components 23, 24, 26, 28, and mail server 34 may use information 30 during operation.

Members of an organization (e.g., a large corporate user) are often linked using a local area network or wide area network. In the illustrative example of FIG. 3, an organization 48 is using a local area network (LAN) to link its employees 40, 42, and 44. Electronic messages (and other network communications) pass through gateway 38 (e.g., one or more computers at the edge of LAN 48). One or more mail transfer agents (e.g., mail server 46) may be used within the organization to facilitate the distribution of electronic messages to employees 40, 42, and 44. In some embodiments, one or more components 20 of an anti-spam service 36 may operate on equipment with an enterprise, for example gateway 38, mail server 46 and/or clients 40, 42, 44.

Anti-spam software components may be installed on user equipment 32 (e.g., a home user's personal computer), on the equipment of an internet service provider or other anti-spam service 36, on the equipment of an organization 48 (e.g., on gateway 38 or mail server 46), or may be installed on any other suitable equipment. All of the anti-spam components may be installed on one type of platform (e.g., one or more clients, one or more devices at an Internet service provider, one or more mail servers, etc.) or some of the anti-spam components may be installed on one type of platform (e.g., a gateway such as gateway 38, a mail server such as mail server 46, an employee computer, etc.) while some other anti-spam components are installed on another type of platform. The message processing and anti-spam components 20 of FIG. 2 may be installed on any suitable equipment in system 10 in any suitable arrangement. The examples of FIGS. 2 and 3 are merely illustrative of some embodiments.

Content-based message analysis component 24 may be a content-based anti-spam filter. In such embodiments, component 24 examines messages for content that is indicative of whether the messages are spam or are legitimate. One example of examining a message's content is to use a text classifier such as a Bayesian text classifier, message signature matcher or heuristic text classifier. By examining the content of messages, content-based message analysis component 24 can often determine whether a message is legitimate or should be treated as spam.

In some embodiments, incoming messages may be challenged by issuing challenge messages. Unless the original sender responds appropriately to the challenge message, the recipient can delete, quarantine, or otherwise handle the message appropriately. An embodiment containing challenges and responses to challenges is herein referred to as challenge-response.

Figure 4:
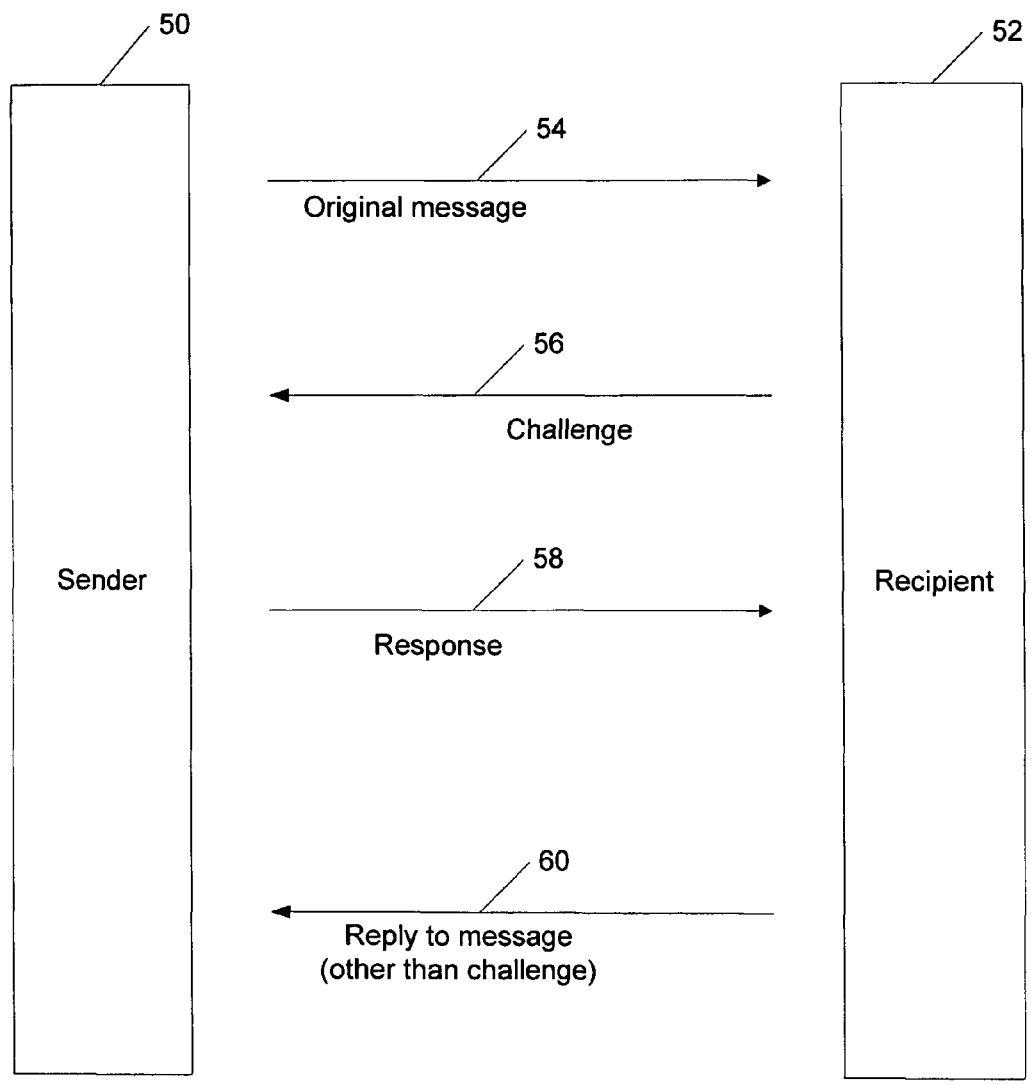
FIG. 4 is an example of challenge-response message verification such as that shown in step 100 of FIG. 7, according to some embodiments.
Figure 7:
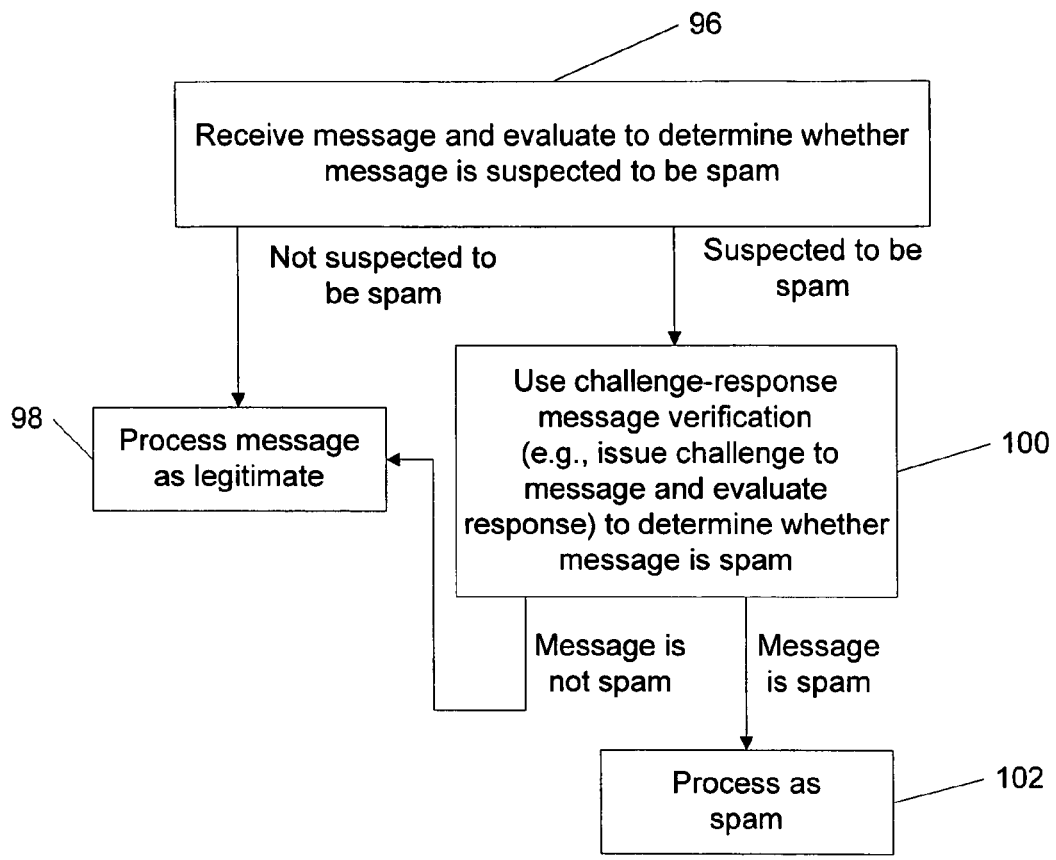
FIG. 7 is a flow diagram of a method for processing spam using content filtering and challenge-response techniques according to some embodiments.

FIG. 4 is an example of challenge-response message verification such as that shown in step 100 of FIG. 7, according to some embodiments. In this example, a sender 50 sends an original message 54 to a recipient 52 over a communications network. The recipient 52 receives the original message and issues a corresponding challenge message 56. The challenge message may, for example, be a message such as an email message sent to the sending address of the original message. (Recipients such as recipient 52 can also send other reply messages 60 to sender 50—e.g., by clicking on a "reply" button in the recipient's messaging client in response to receipt of the original message 54.) When the challenge message 56 is received by sender 50, the sender can process the challenge 56 and can issue a corresponding response 58. When the recipient 52 receives an appropriate response 58, the recipient can process the original message 54 as legitimate. If, however, the recipient 52 receives an inappropriate response 58 to challenge 56 or does not receive any response message, the recipient can process the original message as spam.

The operations shown in FIG. 4 may involve manual and/or automatic operations. For example, composing and transmitting the original message may involve manual and/or automatic message generation and transmission operations. Similarly, receipt and initial processing of the original message and issuance of challenge 56 may involve manual and/or automatic operations. Response generation 58 may also be fully automatic, fully manual, or partly automatic and partly manual.

Figure 5:
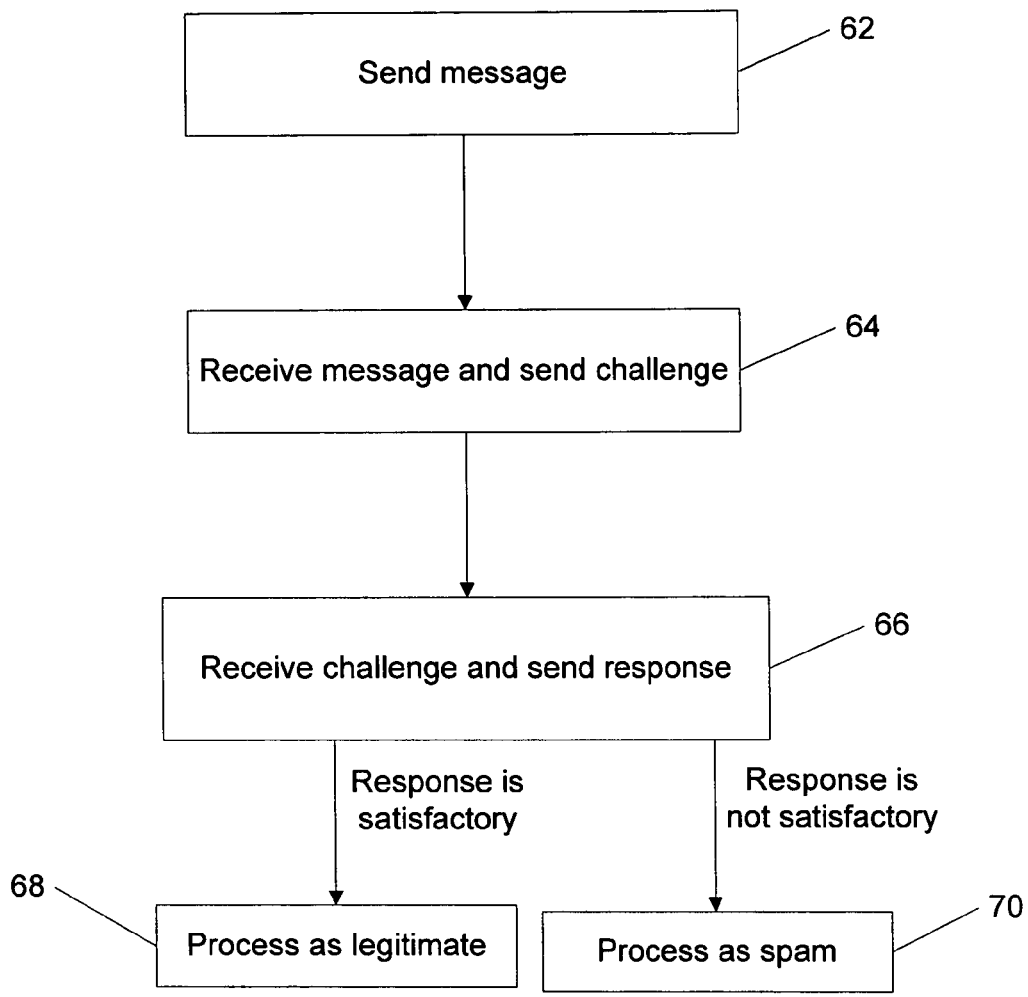
FIG. 5 is a flow diagram of a method for using challenge-response techniques to process spam, for example as shown in steps 98-102 of FIG. 7, according to some embodiments.

FIG. 5 is a flow diagram of a method for using challenge-response techniques to handle spam, for example as shown in steps 98-102 of FIG. 7, according to some embodiments. In this example, at step 62, a sender may send a message, for example over network 16 (FIG. 1). The message may be passed through one or more mail transfer agents before it is received at step 64. During step 64, a challenge may be issued (e.g., by sending an appropriate challenge message to the original sender).

If the original sender is legitimate, at step 66 the original sender receives the challenge message and sends an appropriate response. The response may be a reply to the challenge or may be a separate message. If the challenge presents a puzzle to the original sender, the sender can include the solution to the puzzle as part of the response. In some embodiments, a puzzle may be solved automatically. In some embodiments, a puzzle may be solved manually.

The recipient that issued the challenge awaits an appropriate response. If no response message is received or if the response is otherwise unsatisfactory, the recipient can process the original message as spam at step 70. Appropriate methods for processing spam include deleting the spam message from the recipient's inbox, training a text classifier for future use in excluding similar messages, quarantining the message, etc. If the recipient receives a successful response, the recipient can accept the message at step 68 (e.g., the client software at the recipient can display the original message for personnel at the recipient in an email inbox where it can be viewed on a computer monitor).

Figure 6:
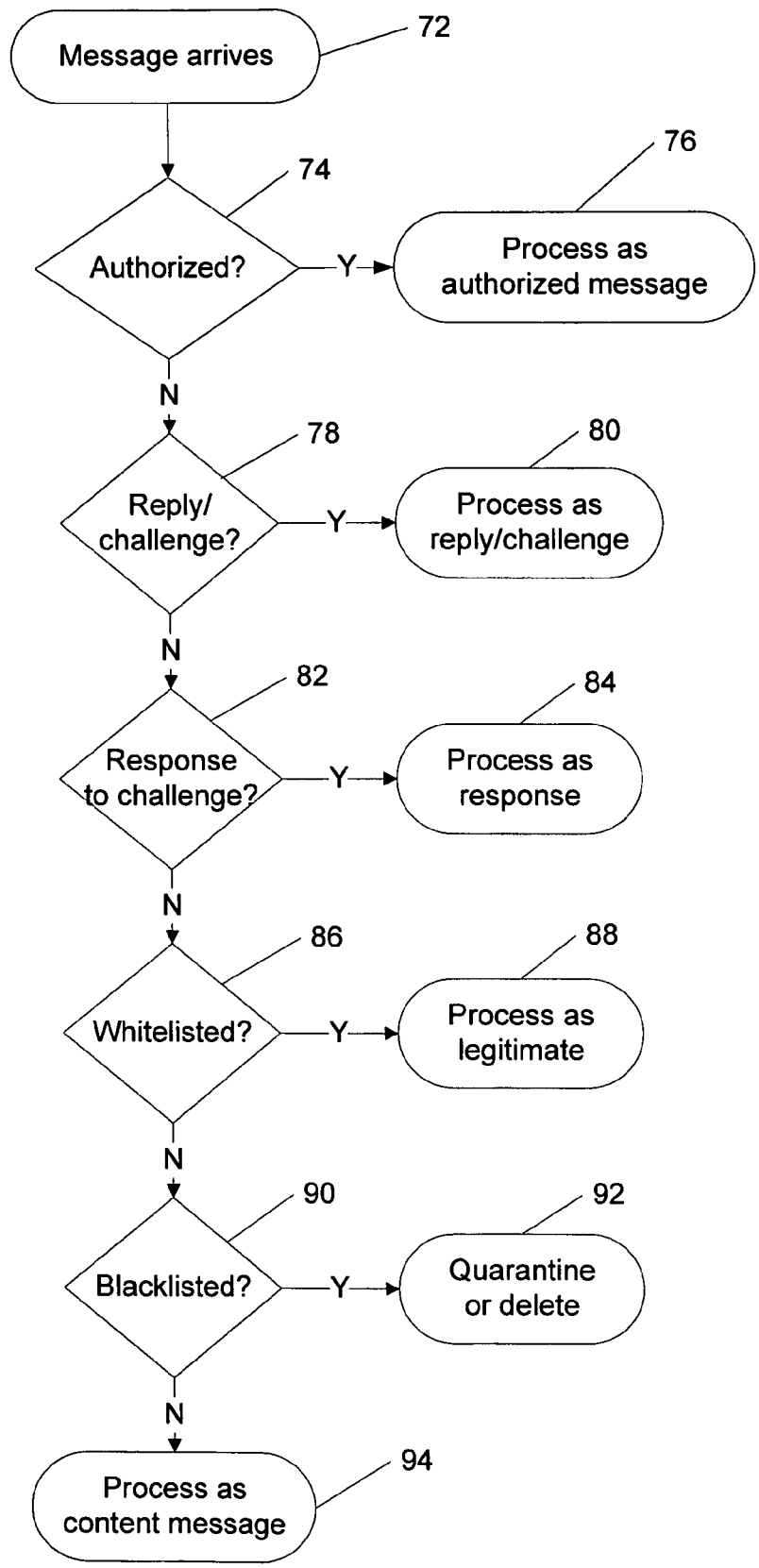
FIG. 6 is a flow diagram of a method for processing messages that may be spam according to some embodiments.

Other techniques may be used to process incoming messages in addition to or instead of using a challenge-response technique. FIG. 6 is a flow diagram of a method for processing messages that may be spam according to some embodiments. The operations shown in FIG. 6 are merely provided as an example. All of the operations of FIG. 6 are optional. All of the operations of FIG. 6 may be used together or only one or some of the operations of FIG. 6 may be used together if desired. Moreover, the order in which the desired operations are shown is not critical. As just one example, a message can be checked to determine whether it is on a whitelist either before or after that message is checked to determine whether it is on a blacklist, etc.

In this example, an incoming message is received at step 72. At step 74, the message is evaluated to determine whether it claims to be an authorized message. If the message claims to be an authorized message, for example by incorporating authorization credentials, the message can be processed as an authorized message at step 76. If a message does not claim to be an authorized message, processing can be continued at step 78.

Any suitable type of authorization may be used. In one example, proof of a sender's authorization may be attached to an original message (e.g., in the form of a digital signature or other cryptographic proof, a token, or other verifiable indicator).

In another example, a trusted party may give a seal of approval to certain trustworthy senders. Examples of providing a seal of approval include providing a sender with a digital certificate from a trusted certificate authority, using a digital signature or other authentication information to prove that the sender has been approved by the trusted party, etc. When an original message is sent to a recipient, authorization information may be provided with the message (or in an associated transmission).

If desired, an entity can authorize other entities (e.g., affiliates) to send messages to the recipient. As an example, a retailer on the internet who has been previously authorized by the recipient can be given authority to authorize affiliates (e.g., business partners) to send email messages to the recipient. The authorized affiliates can prove their authorization to send the recipient messages using a token or other information signed by the authorized retailer. An example of proving authorization is to provide a digital certificate cryptographically signed by a trusted party, indicating that the sender is authorized to send messages.

If desired, messages can be considered to be authorized if they are received with a digital signature (even without further evaluating the nature of the sending party). Messages may also be considered to be authorized when it is determined that the server (for example, a mail transfer agent) from which the message was last sent is authorized to send mail on behalf of the sender or if a cryptographic signature or other authentication information is associated with the sending domain (as an example).

These are merely illustrative authorization techniques. Any suitable authorization checking procedures may be used according to some embodiments.

If the incoming message and/or sending and/or transferring party is determined not to be authorized at step 74, the message may be examined at step 78 to determine whether the incoming message is a challenge or other reply to a message previously sent by the recipient. If the incoming message is a challenge or other reply message, the incoming message may be processed as a reply and/or challenge at step 80.

If, however, it is determined at step 78 that the incoming message is not a challenge or other reply to a message previously sent, the message may be evaluated at step 82 to determine whether the message is a response to a challenge issued previously. If the incoming message is a response message, the incoming message may be processed as a response message at step 84. If the incoming message is not a response message, the message may be evaluated further at step 86.

In particular, during step 86 the recipient may use a whitelist such as whitelist 30 of FIG. 2 to determine whether the sender has been previously indicated to be trustworthy. If the sender's address is contained in whitelist 30, the recipient can accept the incoming message as legitimate. If desired, the recipient can compare other message recipients and/or senders associated with the incoming message (for example, the CC: list of an email) to the whitelist. With this type of approach, the recipient can accept as trustworthy any incoming messages having a recipient or sender who is contained in a whitelist. In some embodiments, one whitelist may be used for both senders and recipients. In other embodiments, separate whitelists may be used for senders and for recipients.

If information on a whitelist indicates that the message is legitimate, the message may be processed as legitimate at step 88; otherwise processing may continue at step 90.

During step 90, a blacklist 30 (FIG. 1) may be used to determine whether or not to accept the message. If the sender or the mail transfer agent that sent the message is contained in a blacklist, the message may be processed as spam. The recipient can also conclude that the message is spam if, for example, the network address (for example the internet protocol (IP) address) of a transmitting server such as a mail transfer agent is on a blacklist 30. These are merely illustrative examples of ways in which a blacklist may be used to determine whether an incoming email is spam or is legitimate. Any suitable blacklist arrangement may be used according to some embodiments.

If it is determined at step 90 that the incoming message is spam, at step 92 the incoming message may be quarantined or deleted. If it is determined at step 90 that the sender and/or mail transfer agent, etc. is not blacklisted, the message may, at step 94, be further processed or delivered to the recipient. Step 94 may involve, for example, content processing techniques in which the text of the message is examined using a text classifier or other software component that evaluates the contents of messages to identify possible spam.

In some embodiments, challenge-response techniques may be used in combination with other anti-spam techniques. For example, before challenge-response message verification using a process of the type shown in FIG. 5, a content filter may be used to filter out at least some incoming messages as being potential spam or as unlikely to be spam.

Any suitable arrangement may be used to evaluate whether a given message is spam. In some embodiments, a content-based message analysis component such as component 24 (FIG. 2) may be used to generate a likelihood metric representing the estimated likelihood that a message is spam. The likelihood metric may be a number or other suitable information indicative of the likelihood that the incoming message is spam.

The content-based message analysis component may be, for example, a text classifier or other component that evaluates messages based on their content. A text classifier may examine the text of a message to determine whether it is likely to be spam. A text classifier may, for example, be based on a Bayesian text filter such as those used in the open source software packages "Spambayes" and "Bogofilter," where the spam likelihood factor is passed out of the filter rather than being used to make a spam/non-spam decision internally. As another example, the text classifier may use a neural network that evaluates messages by weighing various inputs. These inputs may include, for example, inputs from blacklists, inputs related to the structural encoding of messages, inputs from a Bayesian text classifier that has been trained on a corpus of messages that have been pre-classified and user-classified as spam or legitimate, etc. A text classifier based on a neural network may produce a likelihood metric as an output (e.g., an estimated percentage probability that a message is spam, etc.).

FIG. 7 is a flow diagram of a method for processing spam using content filtering and challenge-response techniques according to some embodiments. In this example, at step 96, a message may be received. The received message may be evaluated (e.g., using component 24 of FIG. 2) to determine whether or not the message is believed to be spam. Component 24 may use a content filtering scheme to classify incoming messages. In one example, component 24 can examine the text or other contents of the incoming message to determine whether the message contains keywords or other indicators that the message is suspected to be spam. In another example, component 24 may use a text classifier such as a Bayesian text classifier or support vector machine to determine whether the message is suspected to be spam.

Challenge-response verification (e.g., a challenge-response approach of the type shown in FIG. 5) may be invoked selectively based on the results of the content classification performed at step 96.

If the content classifier of step 96 determines that the incoming message is not suspected to be spam, the message is classified as legitimate and processed accordingly at step 98. For example, the recipient can deliver the incoming message.

If the recipient initially classifies the message as suspected spam, the message may or may not be spam. The recipient can use challenge-response techniques at step 100 to verify whether or not the message is spam. For example, during step 100, the recipient can issue a challenge to the original message and evaluate its response as described in connection with FIG. 5.

If the challenge-response processing performed at step 100 classifies the message as legitimate, the message can be processed as legitimate at step 98. If the challenge-response processing of step 100 indicates that the message is spam, the incoming message may be processed as spam at step 102. For example, the message may be quarantined or deleted.

In some embodiments, a determination of a content-based classifier may be used differently than shown in FIG. 7. For example, in some embodiments, message suspected of being spam by a content-based filter may be processed as spam, while messages not suspected of being spam by a content-based filter may be challenged.

Figure 8:
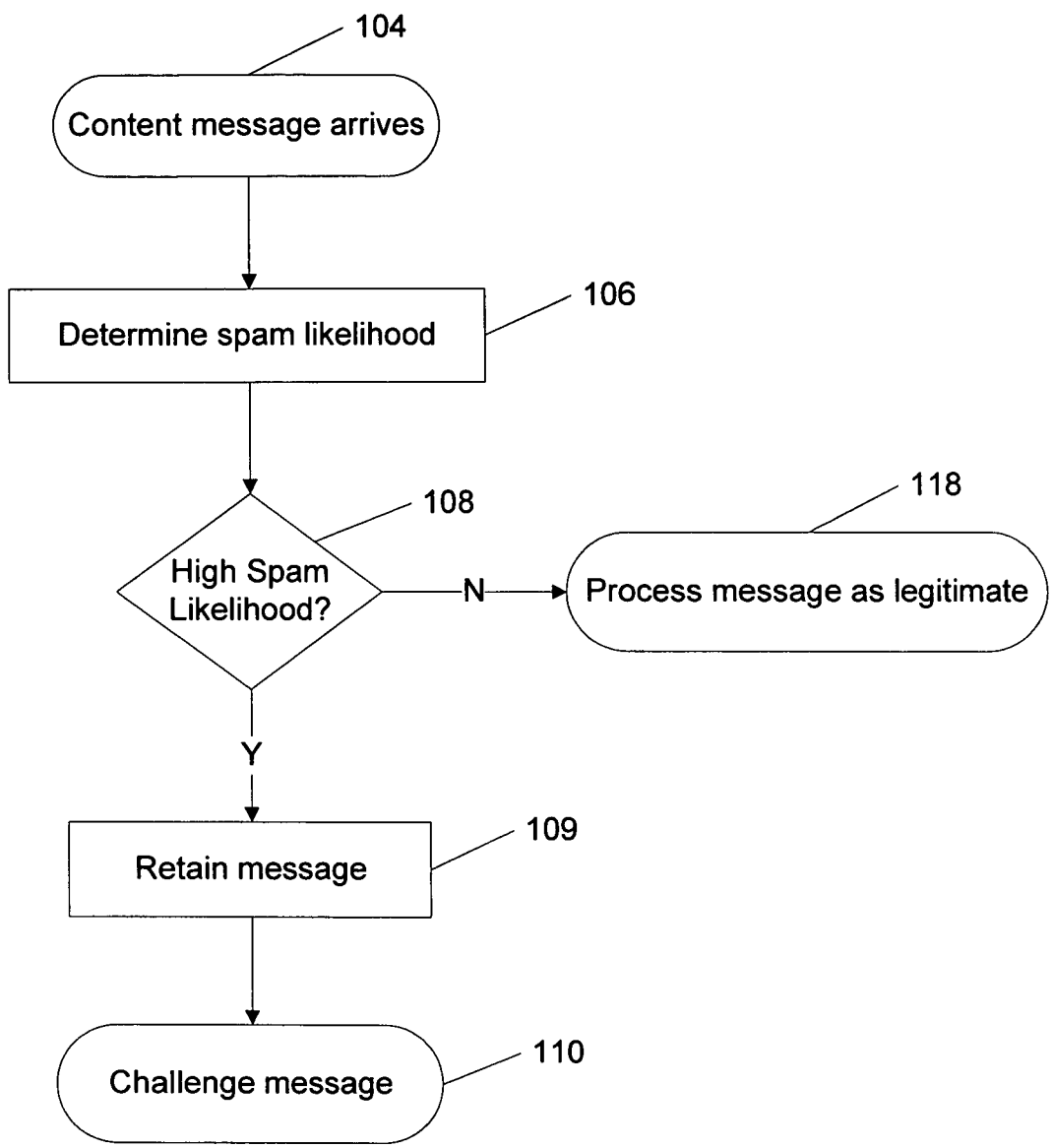
FIG. 8 is a flow diagram of a method for applying a content filter to incoming messages and using a challenge-response scheme to process the filtered messages according to some embodiments.

The operations of FIG. 7 may be implemented in any suitable fashion. One embodiment is shown in FIG. 8. FIG. 8 is a flow diagram of a method for applying a content filter to incoming messages and using a challenge-response scheme to process the filtered messages according to some embodiments. In this example, the message sent to the recipient is received at step 104. In some embodiments, this message may have been preprocessed to be determined that the message contents should be analyzed, for example as described in step 94 of FIG. 6. At step 106, a text classifier or other content analyzing component may be used to analyze the contents of the incoming message to determine the likelihood that the incoming message is spam. The recipient may evaluate the likelihood (e.g., to determine whether it is high or low) at step 108. If the likelihood that the incoming message is spam is determined to be low, the message may be processed as legitimate at step 118.

If it is determined that there is a high likelihood that the incoming message is spam, the message may be retained pending the results of a challenge. For example, the message may be placed in a pool of messages pending responses at step 109 and a challenge issued at step 110. The challenge message may, for example, ask the original sender to send a response and/or may present one or more puzzles for the original sender to solve.

With another illustrative arrangement for spam processing, a text classifier may use two thresholds, herein referred to as a "suspicion threshold" and a "junk threshold." These thresholds may be set to predefined values (for example 40% and 99.5% respectively) or may be configured by a user (e.g., the thresholds may be configured by a system administrator at an organization or by a home user by adjusting settings on a home personal computer). An example of the operation of this type of arrangement is shown in FIG. 9.

Figure 9:
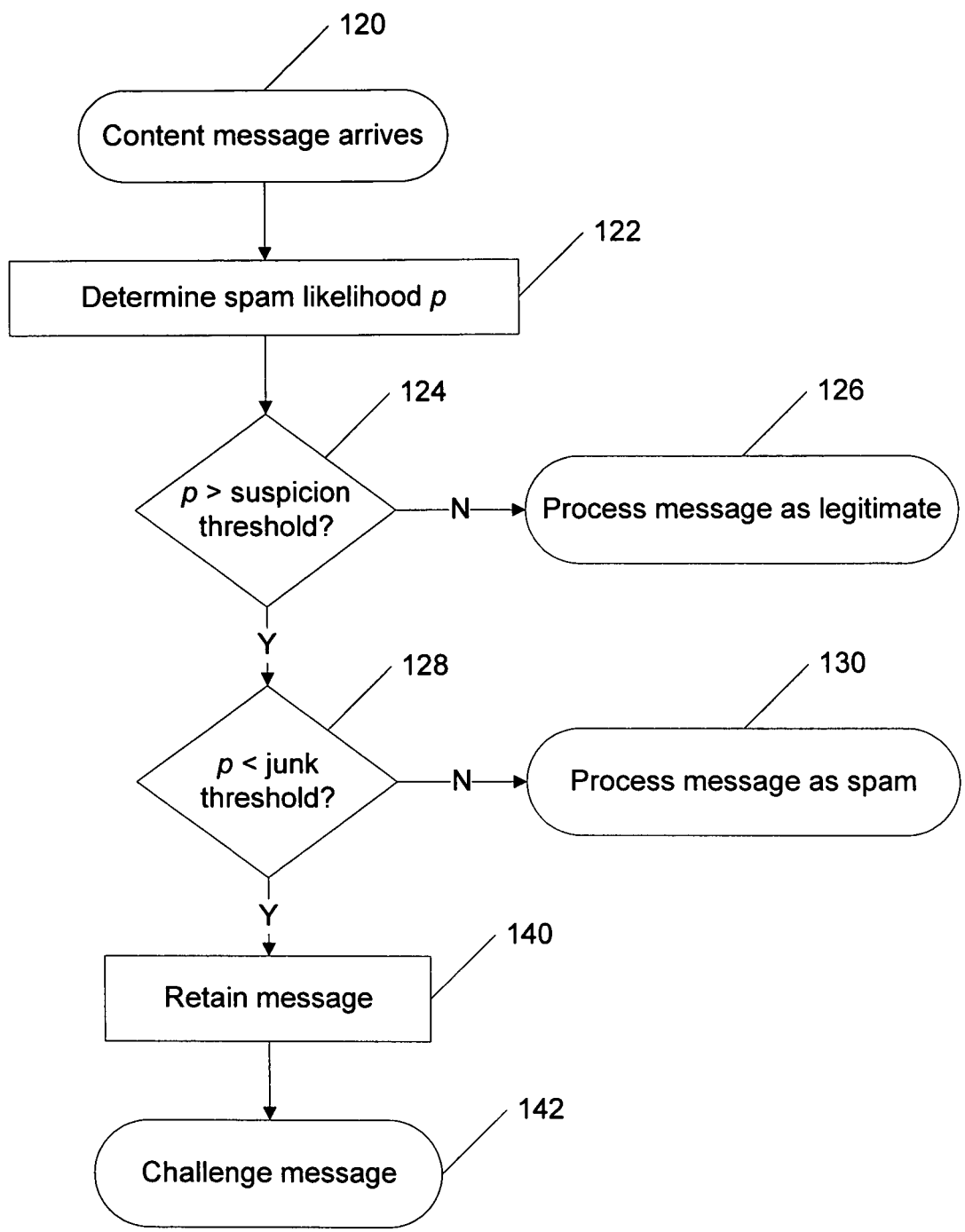
FIG. 9 is a flow diagram of a method for using a suspicion threshold and junk threshold when processing incoming messages using content filtering and challenge-response techniques according to some embodiments.

FIG. 9 is a flow diagram of a method for using a suspicion threshold and junk threshold when processing incoming messages using content filtering and challenge-response techniques according to some embodiments. In this example, at step 120, an incoming message is received. In some embodiments, this message may have been preprocessed to be determined that the message contents should be analyzed, for example as described in step 94 of FIG. 6. At step 122, a content-based message analysis component may be used to evaluate the likelihood that the original message is spam (e.g., a Bayesian filter may be used to generate a spam likelihood value p).

Initially, the likelihood value p may be compared to the suspicion threshold (step 124). If the spam likelihood value is less than the suspicion threshold, the message may be processed as legitimate at step 126.

If the spam likelihood value is greater than the suspicion threshold, likelihood value may be compared to the junk threshold at step 128. If the likelihood value is greater than the junk threshold, the message may be processed as spam at step 130.

If, at step 128, it is determined that the spam likelihood value is less than the junk threshold, the message may be retained at step 140, and a challenge may be issued at step 142. In some embodiments, the message may be held in a pool of messages pending responses (e.g., in a storage location accessible by the recipient such as the recipient's memory or hard drive), while a challenge-response technique is used to determine whether the message is spam or is legitimate.

Figure 10:
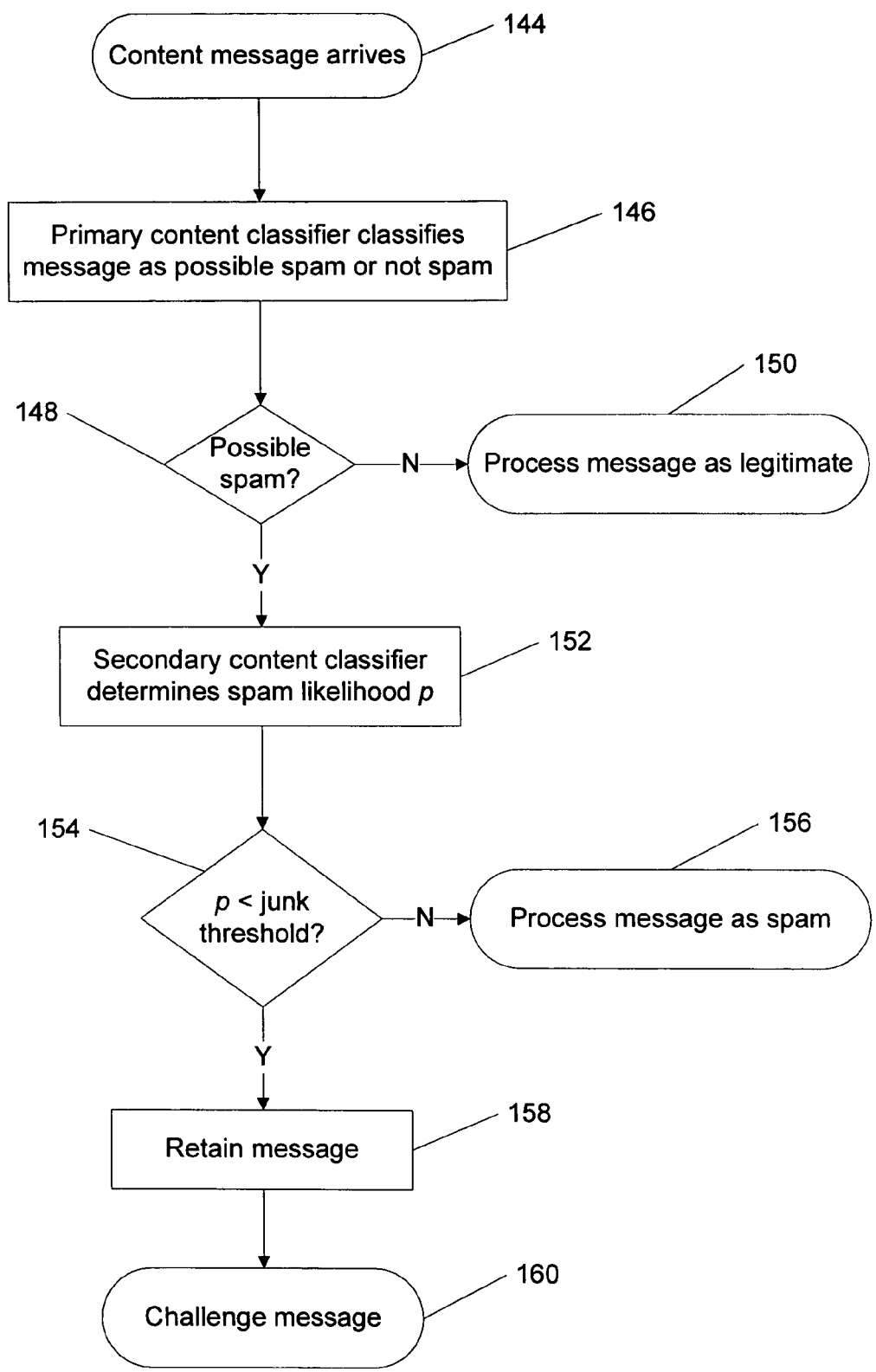
FIG. 10 is a flow diagram of a method for using a suspicion threshold and junk threshold when processing incoming messages using content filtering and challenge-response techniques according to some embodiments.

FIG. 10 is a flow diagram of a method for using a suspicion threshold and junk threshold when processing incoming messages using content filtering and challenge-response techniques according to some embodiments. In this example, a message may be received at step 144. In some embodiments, this message may have been preprocessed to be determined that the message contents should be analyzed, for example as described in step 94 of FIG. 6.

At step 146, a primary content classifier may be used to classify the message as being possible spam or as not being spam. The primary content classifier used at step 146 may be (for example) a content-based message analysis component such as a support vector machine that serves to classify messages in a binary fashion (e.g., as either being possible spam or not). (A binary decision mechanism such as this may, if desired, be implemented using a content classifier tool that generates a scalar "likelihood of spam" metric combined with a threshold test.)

At step 148, the output of the primary content classifier may be used to direct message processing to step 150 (if the primary content classifier determined that the message is legitimate) or step 152 (if the primary content classifier determined that the message is possible spam).

At step 152, a secondary content classifier (e.g., a text classifier such as a Bayesian filter or content-based message analysis component based on a neural network, etc.) may be used to further classify the message by calculating a spam likelihood value p.

At step 154, the spam likelihood value p may be compared to a junk threshold. If the likelihood value is greater than the junk threshold, the message may be processed as spam at step 156. If the likelihood value p is less than the junk threshold, the message may be retained pending the outcome of a challenge operation. For example, the recipient may place the message in a pool of messages pending responses at step 158 and may issue a challenge message at step 160. If a satisfactory response to the challenge message of step 160 is received, the retained message may be processed as legitimate.

In some embodiments, messages may be identified as valid replies by associating an identifier with outgoing messages. For example, a unique message identifier (herein referred to as a message ID) may be inserted into every outgoing message. One example of a generating a message ID is to randomly generate it. Another example of generating a message ID is to sequentially assign it. Yet another example of generating a message ID is to cryptographically sign sequentially assigned message IDs. The message identifier for an outgoing message may be retained by the sender and used to determine the validity of a subsequently received challenge or other reply.

Any suitable arrangement may be used for retaining message identifier information. For example, message IDs may be stored in a suitable memory (e.g., a storage location referred to as "identifier cache") on the sender's equipment or a remote storage location accessible to the sender.

Figure 11:
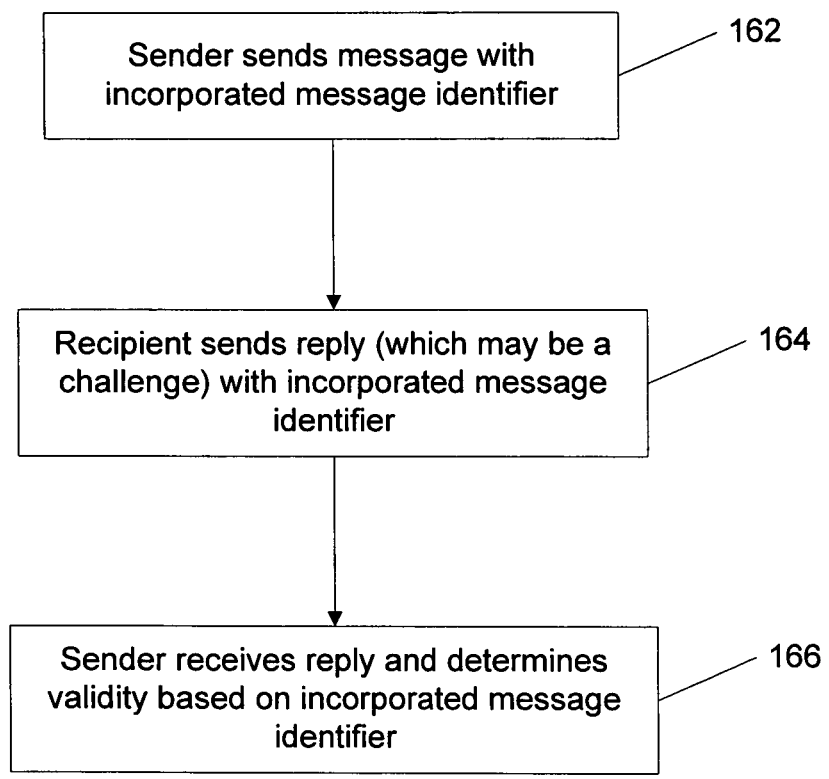
FIG. 11 is a flow diagram of a method for using message IDs to ascertain the validity of replies according to some embodiments.

FIG. 11 is a flow diagram of a method for using message IDs to ascertain the validity of replies according to some embodiments. In this example, at step 162, a message may be sent with an incorporated message ID. A unique message ID may be associated with each message.

At step 164, the recipient of the message sends a challenge message or other reply to the original message back to the sender. The challenge message or other reply may include the message ID.

At step 166, the sender receives the challenge or other reply from the recipient and determines its validity by examining a message ID incorporated in the reply message. An example of determining validity by examining an incorporated message ID is to examine an original message ID incorporated in a reply message and determining whether it matches a retained message ID of a legitimate message previously sent by the sender.

Figure 12:
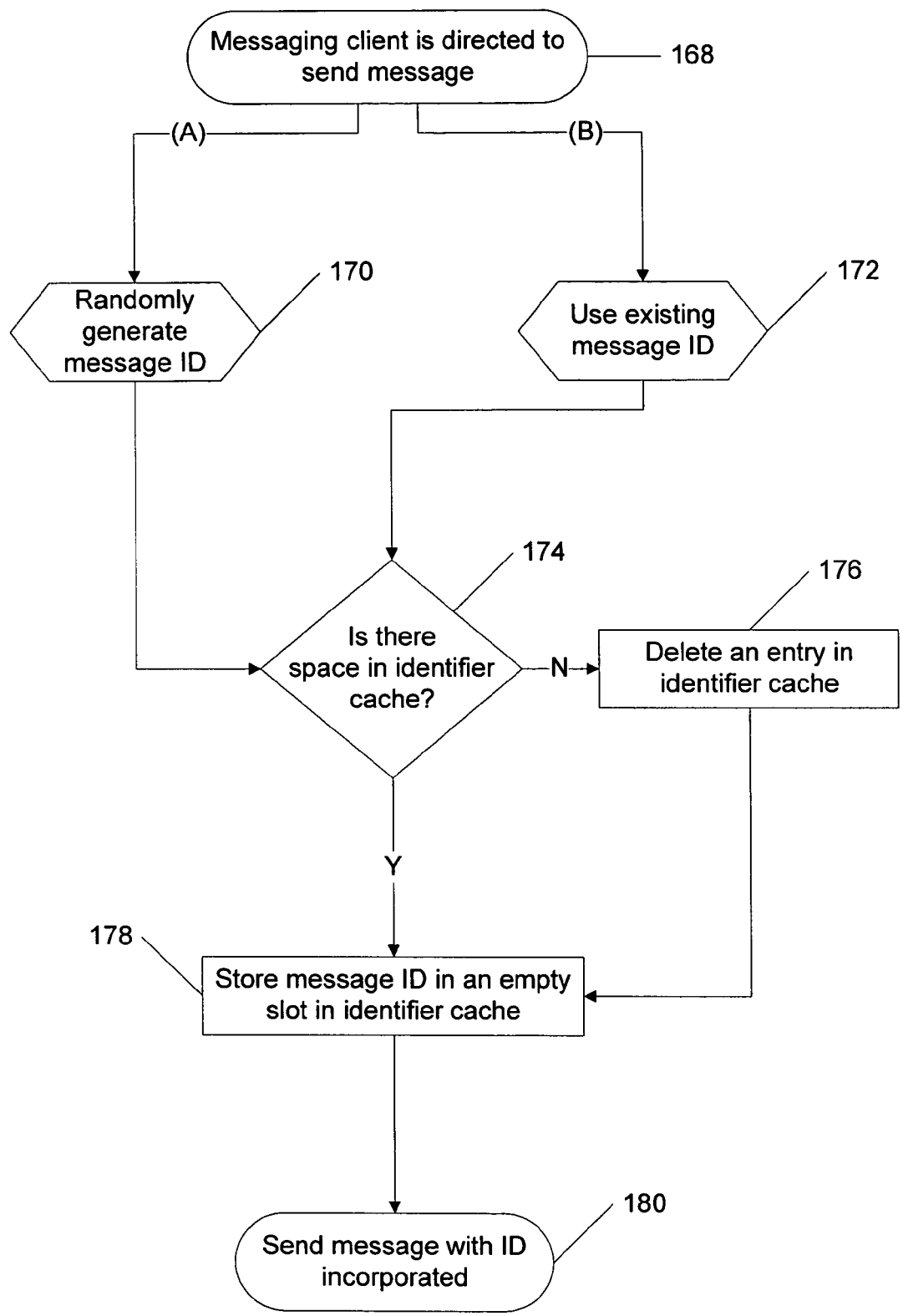
FIG. 12 is a flow diagram of a method for using a message ID cache to maintain information on message IDs according to some embodiments.

If desired, a message ID cache 30 (FIG. 2) may be used to maintain information on the message IDs of messages that are sent. FIG. 12 is a flow diagram of a method for using a message ID cache to maintain information on message IDs according to some embodiments. In this example, at step 168, a messaging client (e.g., messaging client 22 of FIG. 2) may be directed to send a message. For example, personnel at a sender may click on a "send" button in an email program at the sender. In another example, a message may be automatically sent, for example as part of a mailing to a mailing list. If desired, a message ID may be automatically inserted in the outgoing message at step 170. An alphanumeric string or other identifying information may be used for the message ID. One example of a generating a message ID is to randomly generate it. Another example of generating a message ID is to sequentially assign it. Yet another example of generating a message ID is to cryptographically sign a sequentially assigned identifier, and use the signed identifier as a message ID. The message ID may be inserted in the header or body of the message. In some embodiments, a message ID may be automatically generated by a messaging client or server (for example, a message ID used in a "Message-ID" field of an email header). A message ID automatically generated by a messaging client or server may also be used for tracking outgoing message ID's as illustrated in step 172.

At step 174, the message ID cache may be checked to determine whether there is sufficient memory space available to store the message ID of the message. If there is sufficient space available, the message ID may be stored in the cache at step 178. If there is insufficient space in the message ID cache, more room may be made available. For example, the sender may delete an existing entry in the message ID cache at step 176 before storing the message ID in the cache at step 178.

At step 180, the message with its incorporated message ID may be transmitted, for example over communications network 16.

Figure 13:
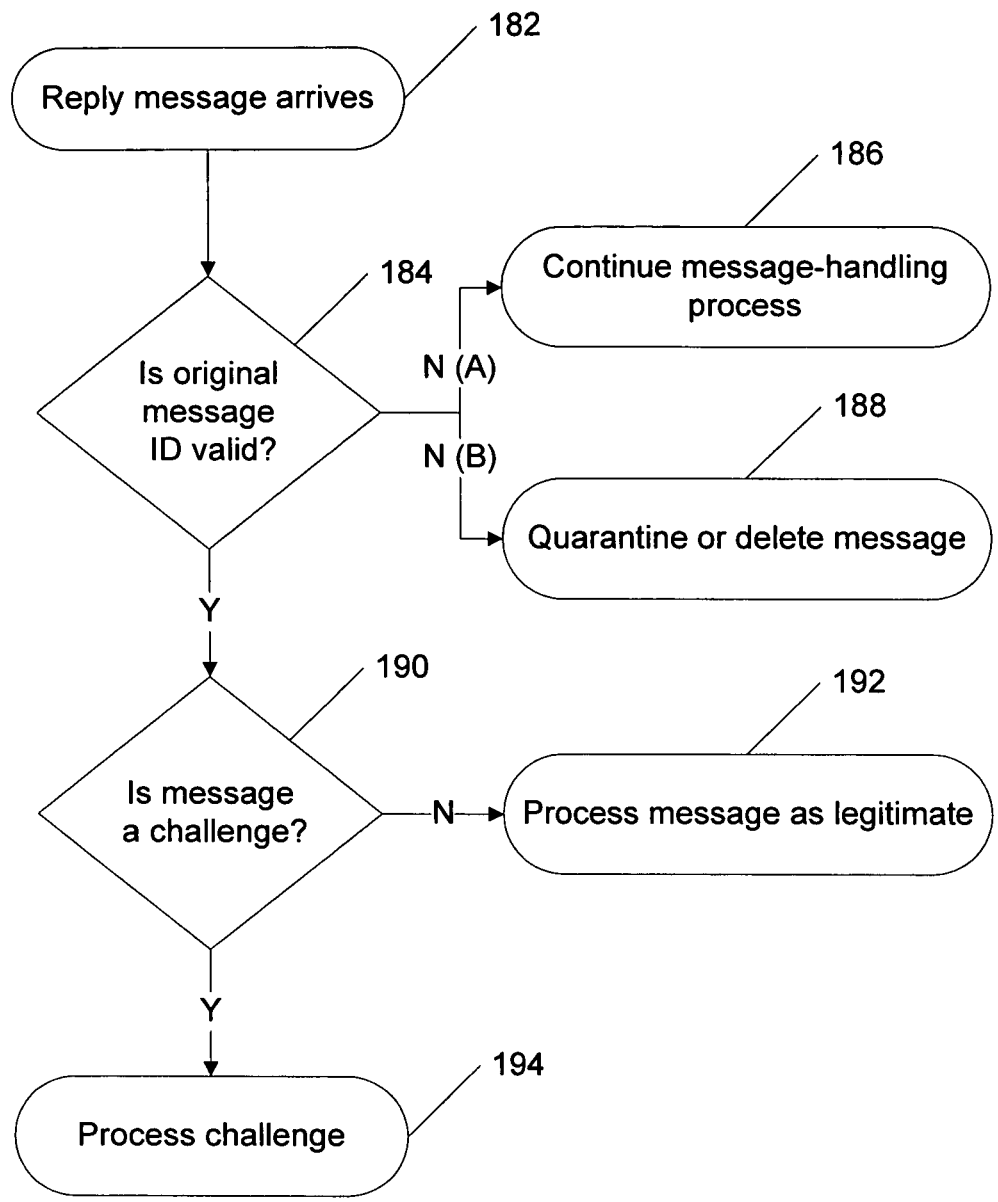
FIG. 13 is a flow diagram of a method for using message IDs to process reply messages according to some embodiments.

FIG. 13 is a flow diagram of a method for using message IDs to process reply messages according to some embodiments. The steps of FIG. 13 are merely illustrative. Any suitable scheme for checking reply message validity may be used if desired.

In this example, at step 182, the sender receives a message that purports to be a reply to a message previously sent by the sender.

At step 184, the original message ID in the reply message is examined to determine whether it is valid. In some embodiments, the original message ID from the reply message may be compared to message IDs for sent messages that have been retained at the sender (e.g., the contents of a message ID cache). A reply message may contain multiple message IDs. For example, a reply message may include the original message ID that was incorporated into the message from the sender. A reply message may also include a message ID that originated with the recipient. The message ID that is checked at step 184 may be an original message ID, corresponding to a message ID in an outgoing message to which the message is a reply. One example of an original message ID is a field in a header or body of a reply message containing an original message ID. Another example of an original message ID is an incorporated message ID provided by messaging facilities, for example an "In-Reply-To:" field in an email header.

A reply message may be processed appropriately if it is determined that that original message ID in the reply message is not valid. For example, the sender may quarantine or delete the message at step 188. As another example, additional message processing steps may be performed at step 186. For example, the sender may provide information that the message ID is not in the identifier cache to an adaptive text classifier subsystem which can use this information to further consider whether or not the reply should be considered legitimate.

If, at step 184, it was determined that the original message ID is valid (e.g., the original message ID from the reply message matches one of the stored message ID values in the message ID cache), at step 190 it may optionally be determined whether the message is a challenge or is a regular (non-challenge) reply. An example of determining whether a message is a challenge is to examine header information in the reply message to determine whether the reply is labeled as a challenge. If it is determined that the reply message is not a challenge, the reply message may be processed as a legitimate message at step 192. If it is determined that the reply message is a challenge message, the challenge may be manually and/or automatically processed by the sender at step 194.

Any suitable approach may be used for verifying whether the original message ID is valid at step 184 of FIG. 13. For example, step 184 may involve checking to determine whether a copy of the original message identifier is contained in a message ID cache.

Figure 14:
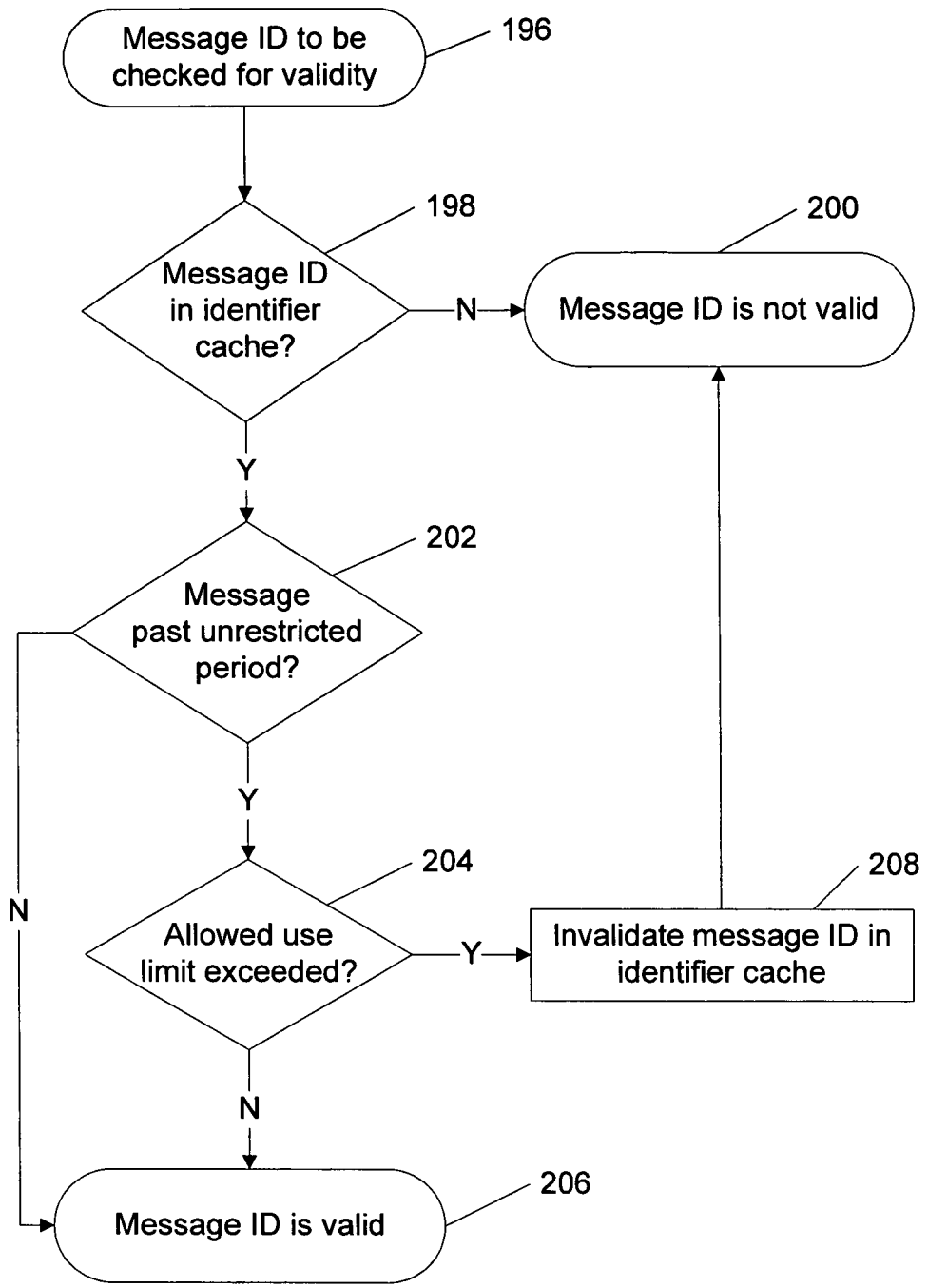
FIG. 14. is a flow diagram of a method for using a message ID cache and message ID usage criteria to process reply messages according to some embodiments.

FIG. 14 is a flow diagram of a method for using a message ID cache and message ID usage criteria to process reply messages according to some embodiments. In this example, at step 196, the original message ID that is to be checked for validity may be extracted from the reply message.

At step 198, the message ID may be compared to contents of a message ID cache. If the message ID is not in a message ID cache, it may be concluded that the message ID is not valid (step 200).

If the message ID is located in the message ID cache, additional operations may be performed to determine whether the message ID is valid. For example, at step 202, the sender may determine whether the message ID is being used past a particular "unrestricted" period of time, for example two weeks from the sending of the original message containing the message ID. If not (i.e., if the message ID is still being used in its unrestricted period), the message ID may be treated as valid (step 206).

If the message ID unrestricted period has expired, additional operations may be performed at step 204 to determine whether an allowed use limit for the message ID has been exceeded. The allowed use limit may be, for example, a particular number of permitted uses (e.g., a threshold value limiting the number of times that replies can use a message ID, for example ten). If the allowed use limit has been exceeded, the sender can process the reply message accordingly. For example, one optional approach involves invalidating the message ID in the message ID cache 30 (e.g., by removing the message ID from the cache, by marking the message ID appropriately, etc.) at step 208 and concluding that the message ID is not valid (step 200). These are merely illustrative examples. Step 208 is optional—any suitable actions may be taken when it has been determined that the allowed usage limit for a particular message ID has been exceeded.

If the allowed usage limit has not been exceeded in step 204, then a message ID may be considered valid in step 206.

The unrestricted usage period feature of step 202 need not be used in conjunction with the allowed use limit feature of step 204. These operations may be performed separately and in conjunction with other message processing functions if desired.

Moreover, other message ID cache management approaches may be used if desired. For example, an automatic expiration mechanism may be used to delete or otherwise expire message IDs from the cache using time-based expiration techniques (e.g., step 202 of FIG. 14), space-based expiration techniques (e.g., based on the capacity of the cache), use-based expiration techniques (see, e.g., step 204), adaptive expiration techniques (e.g., techniques in which the knowledge of a content-based spam classification tool is used in the management of the message ID cache), or combinations of such techniques.

With time-based expiration arrangements, message identifiers may be removed from the identifier cache after a certain fixed or configurable period of time has elapsed. Elapsed time may be measured from when a message ID was added to the cache, from when the last challenge was received, or from any other suitable time. In the example of FIG. 14, any number of messages with the message ID may be received and processed during an "unrestricted" period, after which additional criteria are applied. In other embodiments, usage limits may apply within a period of validity for a message ID.

Space-based expiration herein refers to removing identifiers from a message ID cache when the contents of the cache has grown beyond a certain size or beyond a certain number of entries (either fixed or configurable). The particular identifier that is to be removed may be selected using any suitable method such as least-recently-used, first-in-first-out, random selection, removal of message IDs for which replies have already been received, etc.

Identifiers may be removed based on usage. With use-based expiration, message IDs may be removed from a message ID cache after a given number of replies have been received for that message ID (see, e.g., step 204). This type of limit on the number of replies may be a specific number (either fixed or configurable), based on a function of the number of addressees on the outgoing message with which that identifier is associated, or may be any other suitable limit. Use-based expiration may be supplemental to other expiration processes. For example, a message that has not been expired due to its usage characteristics may still be expired due to elapsed time, space overruns, or other expiration criteria.

If desired, message identifiers may be removed from a message ID cache using a hybrid approach of the type shown in FIG. 14. A message identifier could still be subject to deletion from the identifier cache for reasons of time and/or space before the maximum limit was reached.

Adaptive expiration may also be used. In some embodiments, the amount of time elapsed and/or the number of responses to a message (optionally classified as being before and after a time threshold) may be passed into an adaptive spam detection system, for example a neural network, that may use this information in addition to other information about the message (for example, presence or absence on a blacklist and a whitelist, and the results of a classifier such as a Bayesian classifier). An adaptive spam detection system may, for example, use this information to help make a determination whether the response is considered a spam, and may optionally trigger deletion from the identifier cache.

These cache management techniques are merely illustrative. Any suitable arrangement for managing the contents of a message ID cache may be used if desired.

Figure 15:
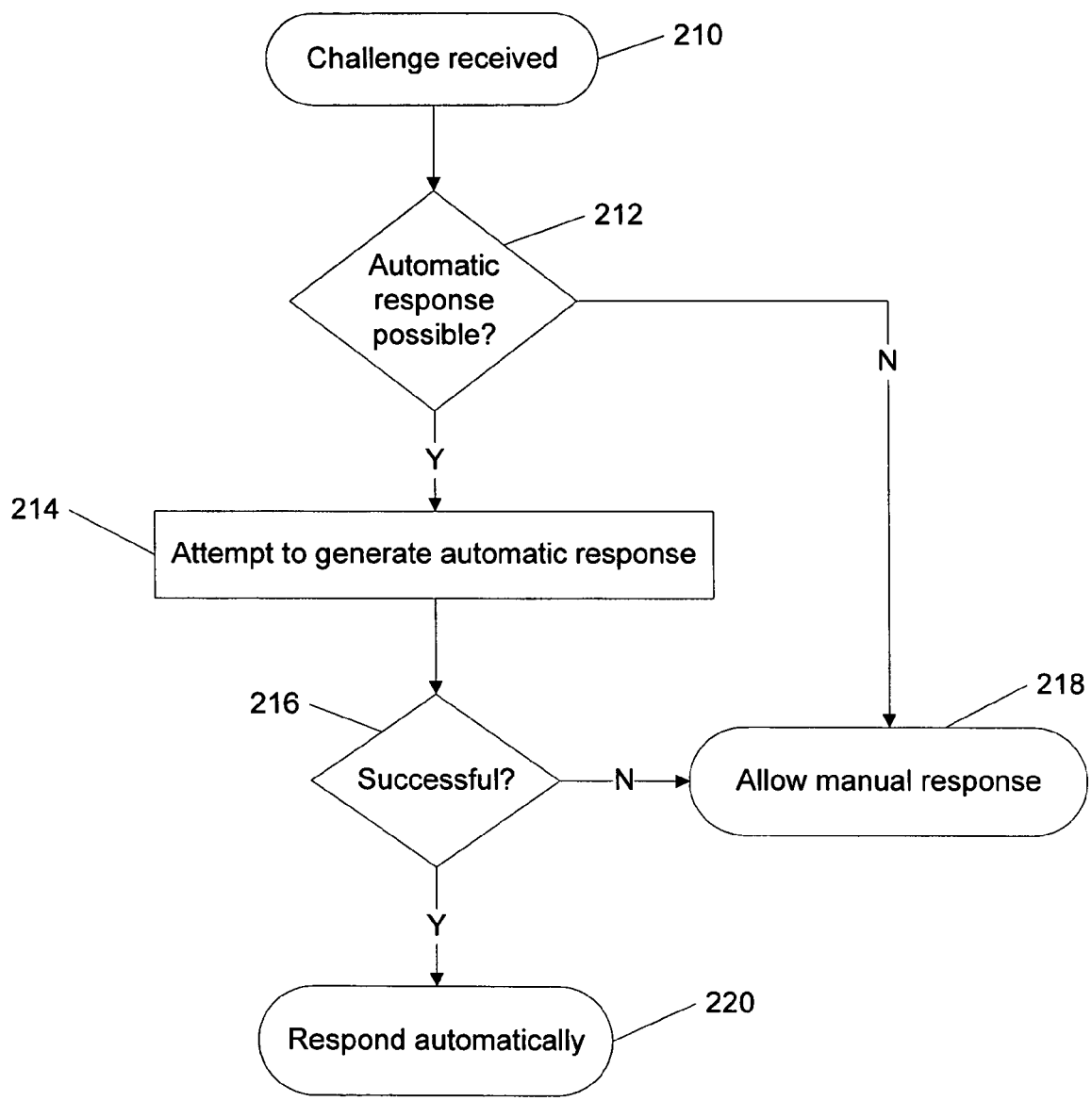
FIG. 15 is a flow diagram of a method for processing challenge messages according to some embodiments.

FIG. 15 is a flow diagram of a method for processing challenge messages according to some embodiments. In this example, the approach of FIG. 15 may be used when it is desired to process a challenge message. For example, the approach of FIG. 15 may be used in step 194 of FIG. 13.

At step 210, a challenge message may be received. At step 212, it may be determined whether automated response processing is possible. If it is not possible to automatically respond to the challenge, the challenge may be processed manually at step 218. For example, personnel at the sender may manually solve a captcha that is associated with the challenge. A captcha herein refers to a puzzle intended to be solvable by a human. In some embodiments, a captcha may be intended to be impossible or impractical to solve automatically with a computing device. For example, a captcha may rely on human interpretation capabilities, such as the ability to read a distorted rendering of text, identify an image, discern a distorted audible rendition of a word. In another example, a captcha may rely on human knowledge, such as the ability to answer a question requiring knowledge about the world or current events.

If an automatic response to the challenge is possible, an attempt may be made to generate an appropriate automatic response at step 214. For example, an attempt may be made to solve a computer-solvable puzzle in the challenge. At step 216 it is determined whether the attempt to generate the automatic response was successful. If the attempt to generate the automatic response was not successful, a manual response may be made at step 218. One example of an unsuccessful attempt to solve a puzzle is to fail to recognize the puzzle, or to determine that the puzzle is too difficult. Another example of an unsuccessful attempt to solve a puzzle is to exceed a maximum time allotted for solving puzzles, for example ten seconds. If the attempt to generate the automatic response was successful, an automatic response including a generated answer to the puzzle may be sent to the recipient as proof of successful completion of the challenge at step 220.

Any suitable approach may be used to generate automatic and manual responses to challenges if desired. The example of FIG. 15 is merely illustrative. Another suitable example of how automatic and manual responses to challenges may be handled is shown in FIG. 16.

Figure 16:
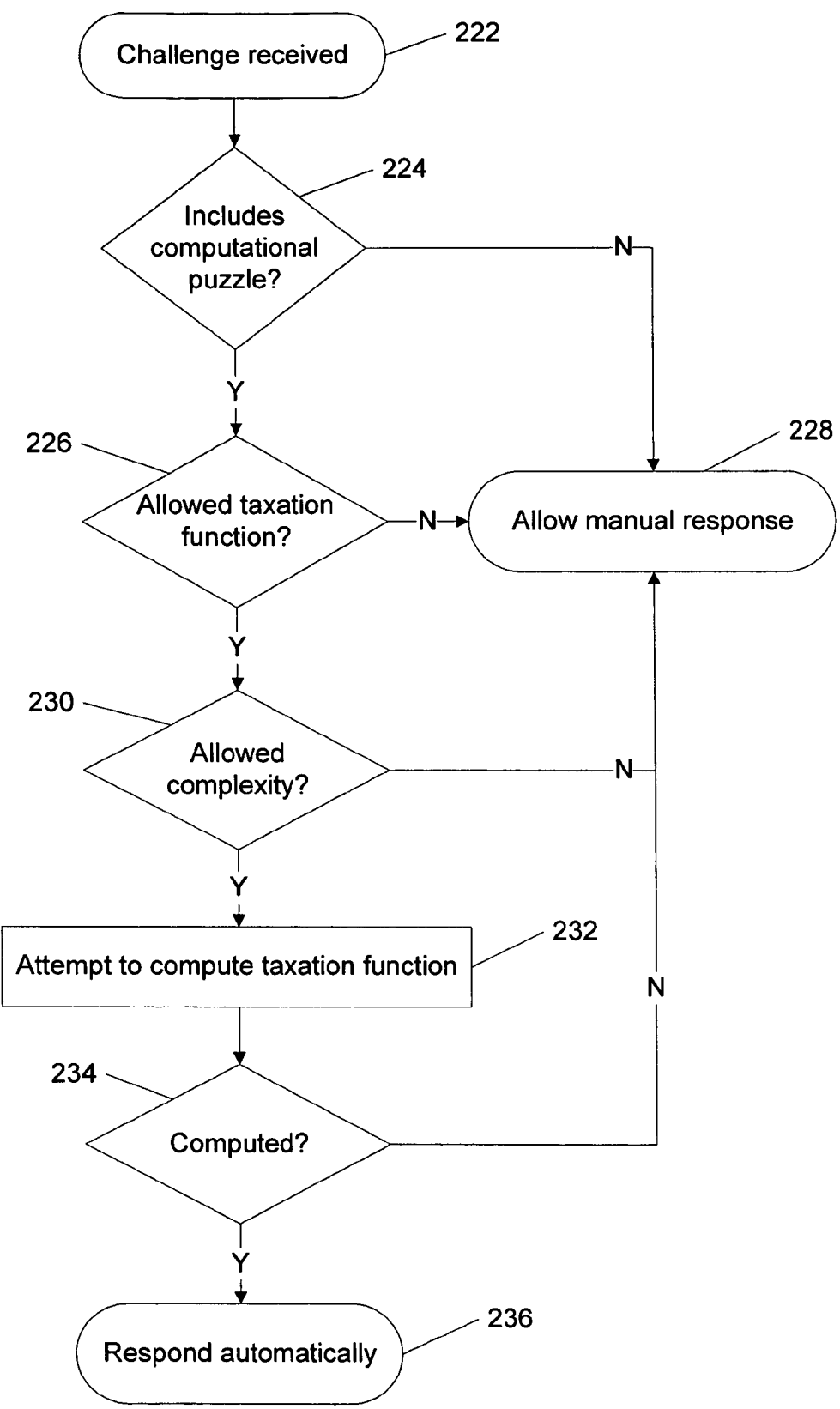
FIG. 16 is a flow diagram of a method for processing challenge messages including a taxation function according to some embodiments.

FIG. 16 is a flow diagram of a method for processing challenge messages including a taxation function according to some embodiments. In this example, after a challenge message is received at step 222, it may be examined at step 224 to determine whether the challenge message includes a computational puzzle. Information on whether or not the challenge message includes a computational puzzle may be provided (for example) in the header of the challenge message, as shown by the "X-Challenge" identifier 250 in the illustrative challenge in the example of FIG. 17. One example of a computational challenge is a challenge for which any reply is acceptable.

If, at step 224, it was determined that the challenge message does not include a computational puzzle, a manual response may be allowed, for example by delivering the challenge to a recipient such as a user, and permitting the recipient to compose a reply (step 228). A reply may, for example, contain a response to a human-solvable puzzle. Puzzles that can be solved by humans include certain visual puzzles intended to require human skills to solve (or impractically large amounts of computational power), puzzles that pose questions that require knowledge of humankind (i.e., puzzles posing questions such as "who is the president of the United States?"), and other human-oriented tasks. Puzzles intended to be solvable only by humans (or that would require excessively large amounts of computing power to solve) are herein referred to as captchas.

If, at step 224, it was determined that the challenge message includes a computational puzzle, the challenge message may be examined at step 226 to determine whether the puzzle is an allowed (known) taxation function that the sender is prepared to respond to automatically. A "taxation function" refers herein to a function that can be solved to derive an answer to a computational puzzle. Examples of taxation functions include functions that are computationally difficult, or require many memory accesses, to solve. In some embodiments, taxation functions may be easier to verify than to solve. Allowability at step 226 can be determined based on predetermined or user-defined criteria such as criteria on the type of taxation function challenges that are acceptable.

If the challenge puzzle is not of an allowed type, responsibility for responding to the challenge in a satisfactory fashion may be passed to personnel at the sender (step 228). If, however, the challenge puzzle is recognized as being based on an allowed taxation function at step 226, it may, at step 230, be determined whether the puzzle has an appropriate level of complexity. If not (i.e., if it is determined that the taxation function puzzle would require too much computational power to solve), a manual response to the challenge may be allowed to be generated (step 228). If, however, the puzzle has an allowed level of complexity, an attempt may be made to solve the taxation function puzzle (i.e., by computing the taxation function) at step 232.

At step 234, it is determined whether the taxation function solution has been properly computed. If the taxation function has not been computed, a manual response to the challenge may be allowed to be made at step 228. If the taxation function has been computed successfully, a response may be generated containing an answer to the puzzle and may be sent back to the recipient at step 236. In some embodiments, steps such as step 236 (and the steps leading to step 236) may be performed automatically, without manual intervention.

FIG. 17 shows an illustrative format for a challenge according to some embodiments. In this example, a challenge 238 may include a message header 240 and message body 242.

Message header 240 may include some or all of the fields shown in the example of FIG. 17, with various labels and formats. The format of FIG. 17 is merely illustrative.

In the example of FIG. 17, challenge 238 contains a captcha 246. An encoded answer 244 to the captcha 246 may also be provided in message 238. Providing both the encoded answer to the captcha and the captcha itself in the challenge message helps facilitate the verification of challenge responses. In one scenario, a user who is responding to a challenge with a captcha sends a response to the challenge that contains both the answer (e.g., the typed-in letters "NSF" in the example of FIG. 17) and the encoded version of that answer 244 that was obtained from the challenge header. At the challenger, a verification algorithm may be run to determine whether the user-supplied answer to the captcha is correct.

The message 238 of FIG. 17 has an original message ID 248 (to which the message of FIG. 17 is replying). For example, an original message ID 248 may have been generated as illustrated in steps 170 or 172 of FIG. 12. A reference to the original message ID may also be included in a challenge-specific field such as challenge identifier 250. Message ID information may be included in the header or the body of the message. In the example of FIG. 17, message ID information is included in the header.

In the example of FIG. 17, the challenge identifier 250 incorporates the message ID of the message being challenged. Challenge identifier 250 also incorporates specifications that define a computational puzzle associated with message 238. Computational puzzles may be based on any suitable computational algorithm. In some embodiments, puzzle algorithms that are time consuming to solve (e.g., because they require numerous trial-and-error operations) and whose answers are computationally easy to verify with a corresponding verification algorithm may be used.

When a valid challenge to an original message is received, parameters in challenge identifier 250 may be used to solve a computational puzzle, e.g. by computing a taxation function with the provided parameters.

Puzzle specifications refer herein to any set of specifications that define an acceptance criterion for a solution to a computational puzzle. In the example of FIG. 17, the challenge identifier 250 contains puzzle specifications that specify a type of puzzle (a puzzle based on an MD5 hash function, indicated by the "MD5Challenge" identifier), and output acceptance criteria (3 and 1001011110 in the FIG. 17 example). In this example, the challenge identifier 250 also includes an encoded version of the challenge specification (the last string in identifier 250 in this example). The challenge message header parameters 200310012137.h91Lb4e2019444@sender.com, MD5Challenge, 3, and 100101110 in the headers of the challenge message may mean (for example) that a successful response must provide text that, when appended to predetermined baseline data ("200310012137.h91 Lb4e2019444@sender.com" in this example, which is also the original message ID), yields an MD5 hash value whose nine low-order bits are 100101110 once the lowest 3 bits of the hash have been discarded. In other embodiments, data such as randomly generated text or hashed contents of an original message may be specified as baseline data for solutions. An automated challenge response system receiving this challenge may generate text, randomly or otherwise, until text meeting the specified criteria is identified. The system may then send back an automatic response incorporating that text. For example, the automatic response system may insert "X-Response: 200310012137.h91Lb4e2019444@sender.com, ResponseText" into the header of the response, where ResponseText represents text which meets the criteria of the challenge. In the example of FIG. 17, the text (in challenge identifier 250) "CDE47EF73A184838340AAFCE4B402C97" represents an encoded specification of the puzzle (for example specifying the message ID, taxation function and parameters) which may be sent back as a component of ResponseText to facilitate verification of the response.

In some embodiments, using parameters in the challenge that define the challenge function and parameters that adjust the difficulty of the challenge function may allow the taxation function to be changed over time (e.g., automatically or in response to the input of a user or administrator). New taxation functions may optionally be incorporated into the system, for example by code updating mechanisms known to those, skilled in the art. Taxation functions used for specifying challenge puzzles may be provided to users as part of their original software, as part of an upgrade, or using any other suitable technique. If desired, taxation functions and other parameters may be cryptographically signed to guarantee that they are legitimate.

The difficulty of taxation functions may be automatically scaled with time to keep pace with expected advances in processing power. As an example, the taxation function of FIG. 17 may be automatically scaled by starting with a value of n that is expected to take approximately five seconds to compute on a typical personal computer, and adding one bit to n every eighteen months thereafter.

If desired, challenge messages such as challenge 238 may be configured to use a null taxation function, which may be specified either by the inclusion of a trivial taxation function, or by the omission of the taxation function parameters. In this situation, any response to a challenge message could be treated as a valid response.

A sender may not desire to receive challenges from recipients at the same message address from which an original message is sent. To accommodate different desired challenge addresses, senders may include challenge address information in the messages that are sent to recipients. As shown in FIG. 17, for example, a sender may include information such as challenge message address 251 to indicate to potential challengers a location to which challenge messages should be sent. A challenge address 251 may also be used as an address to which responses may be sent. In some embodiments, a challenge address and response address may be the same. In other embodiments, a challenge address and response address may be specified separately.

If desired, challenges may include both taxation functions and captchas. This type of arrangement is shown in the example of FIG. 17, which includes both a computational challenge (as indicated by the MD5 hash taxation function specified in challenge identifier 250) and captcha 246. Body 242 may include instructional text that informs manual responders to the challenge message how to respond. In the example of FIG. 17, instructions 254 are provided that instruct the responder to solve the captcha 246.

Challenge 238 may also include an option such as a marketing message and clickable link 256 that provides new users with an opportunity to download software for automatically responding to future challenge messages. A user receiving a message such as challenge 238 may click on the link in region 256 to initiate a software download (e.g., a download of suitable messaging processing components 20 such as challenge-response component 26) or access a location at which a software download may be initiated. Later, when a challenge message is received, a message processing component (e.g., challenge-response component 26) may automatically respond to the challenge (e.g., by computing the answer to a taxation function puzzle posed by the challenge, etc.).

Figure 18:
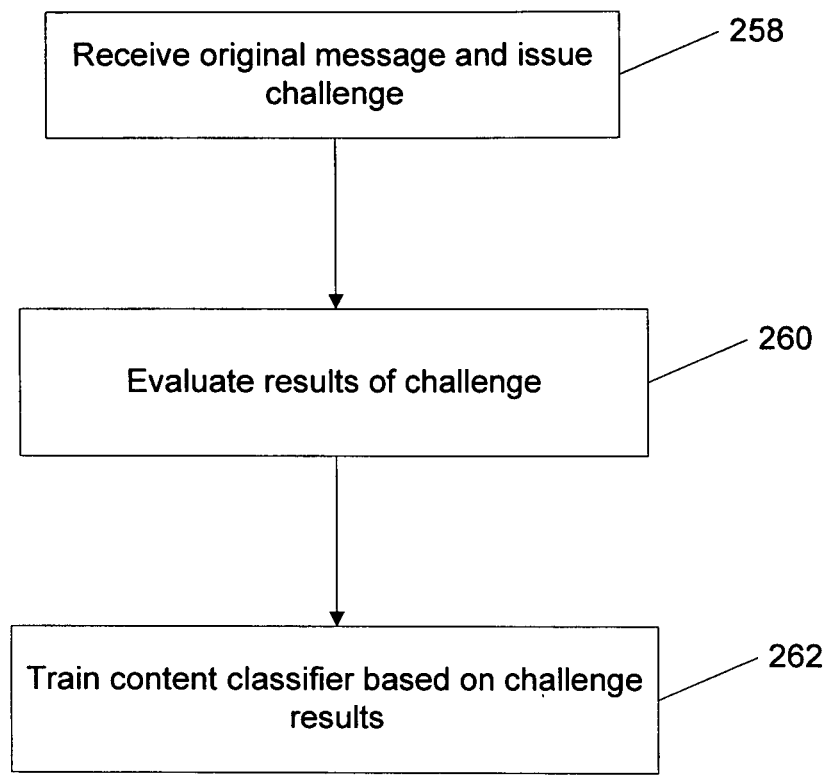
FIG. 18 is a flow diagram of a method for training a content classifier based on the results of a challenge according to some embodiments.

FIG. 18 is a flow diagram of a method for training a content classifier based on the results of a challenge according to some embodiments. In this example, at step 258, an original message is received, and challenge-response components such as component 26 of FIG. 2 are used to issue a challenge. The challenge may be, for example, a message such as an email message having a format of the type shown in FIG. 17.

At step 260, results of the challenge may be evaluated. For example, incoming messages may be monitored to determine whether a response to the challenge is received and, if a response is received, whether it contains an appropriate answer to any puzzle posed in the challenge.

At step 262, the evaluation of the results that was performed at step 260 may be used to train a content classifier (e.g., a Bayesian, support vector machine, or neural network content-based anti-spam filter or other suitable content-based message analysis component such as component 24 of FIG. 2). For example, if no response was received to the challenge or if an incorrect response was received, the content classifier can be informed that the original message was spam. If a satisfactory response is received, the content classifier can be informed that the original message was legitimate. The content classifier can be trained using any suitable criteria associated with the messages (e.g., sender email addresses, IP address information, header information, body text information, etc.) to use in future content classification operations. A trained content classifier may be used to block spam (e.g., alone or in conjunction with a challenge-response arrangement, etc.).

One example of providing training feedback to a content classifier in step 262 is to pass the text classifier a representation of the probability that the challenged message was spam in conjunction with a copy of or reference to the message. For example, if a correct response to a challenge is received, a suitable probability (for example, 0%) may be sent to component 24 in conjunction with a reference to the message. If no response to a challenge is received after a given period of time (which may be hard-wired into the system or may be configurable by a user or administrator), a suitable probability (for example, 90%) may be sent to the component 24 in conjunction with a reference to the message. If an incorrect response to a challenge is received, a suitable probability (for example, 90%) may be sent to the component 24 in conjunction with a reference to the message. If the sender was unreachable, a suitable probability (for example, 95%) may be sent to component 24 in conjunction with a reference to the message. If desired, only the success or failure of a challenge may be passed to the content-based message analysis component.

Any suitable arrangement may be used to train a content classifier based on challenge results as discussed in connection with FIG. 18.

Figure 19:
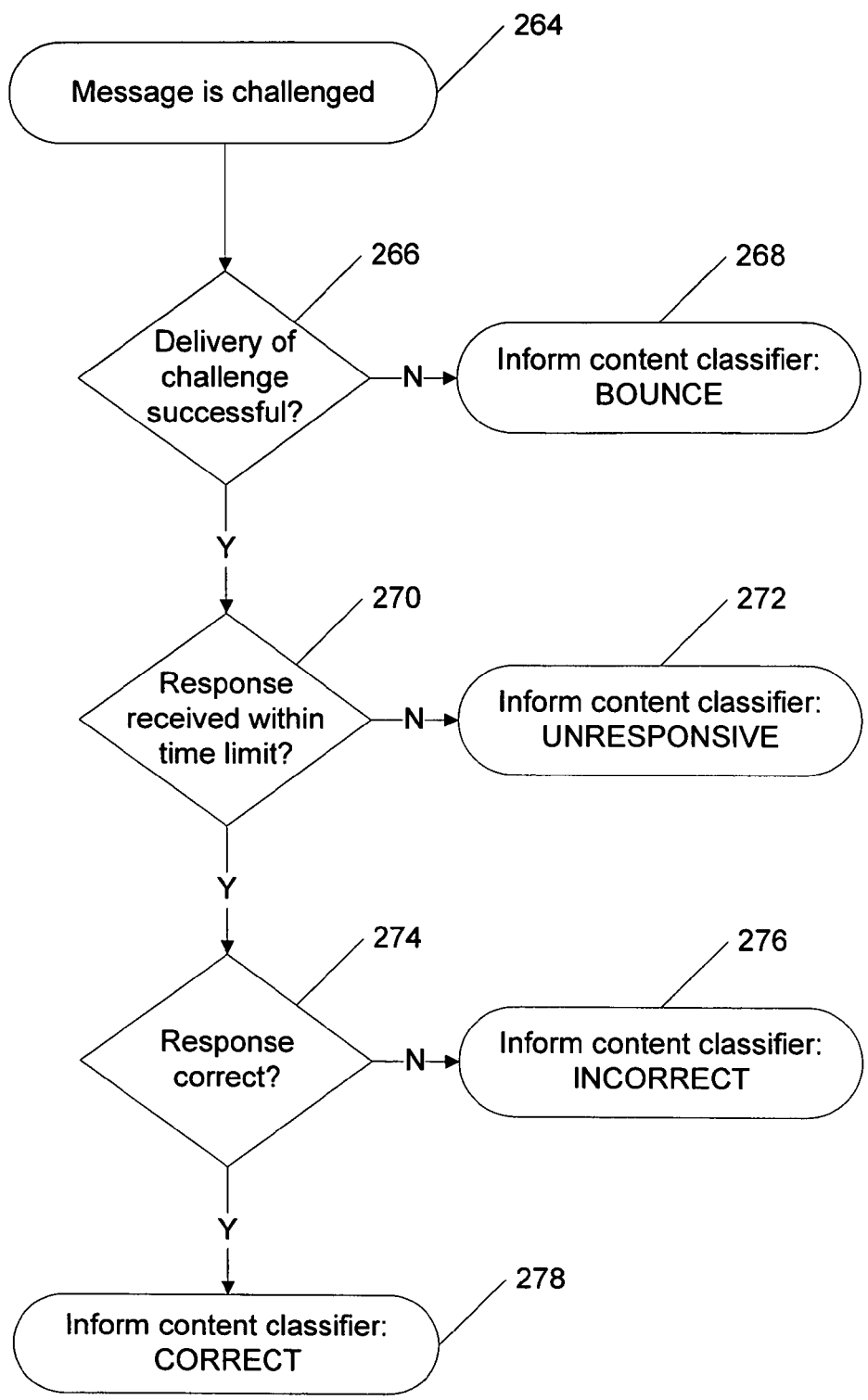
FIG. 19 is another flow diagram of a method for training a content classifier based on the results of a challenge according to some embodiments.

FIG. 19 is another flow diagram of a method for training a content classifier based on the results of a challenge according to some embodiments. In this example, a message that has been received may be challenged by a recipient at step 264. The results of the challenge message may be evaluated and used to train a content classifier (e.g., a content-based message analysis component such as a text-based anti-spam filter).

At step 266, it is determined whether delivery of the challenge was successful. An example of unsuccessful delivery of the challenge message that was issued at step 264 is that it may be returned as being undeliverable (e.g., a server may send a message back to the recipient stating that the address is unknown, etc.). Messages that provoke such error messages are herein referred to as having "bounced." Accordingly, the challenge-response component 26 may inform the content-based message analysis component 24 at step 268 that the challenge has been bounced or was otherwise undeliverable.

It can be determined at step 270 whether a response has been received within an appropriate time limit. An appropriate time limit may be predetermined, for example two weeks, or may be configurable, for example by a user or systems administrator. If a response has not been received within an appropriate time limit, a content classifier may be informed that the challenged entity is unresponsive at step 272.

If a response was received within the appropriate time limit, the recipient may use a response verification algorithm at step 274 to determine whether or not the received response is correct. If the response is not correct, the content classifier may be informed accordingly at step 276. The information gathered by the content classifier at steps 268, 272, 276 and 278 may be used to train a content-based classifier.

If the response to the recipient's challenge message is correct, a content classifier may, at step 278, be informed that the challenge has been successfully answered.

Using the approach of FIGS. 18 and 19, text classifiers (e.g., components such as component 24 of FIG. 2) may adapt their characteristics based on classification of messages by challenge-response component 26.

In some embodiments, training of a content classifier may be automatic. If desired, information on whether messages are spam or legitimate may also be provided to text classifiers when a user manually classifies a message that was incorrectly classified as legitimate as spam or vice-versa.

Figure 20:
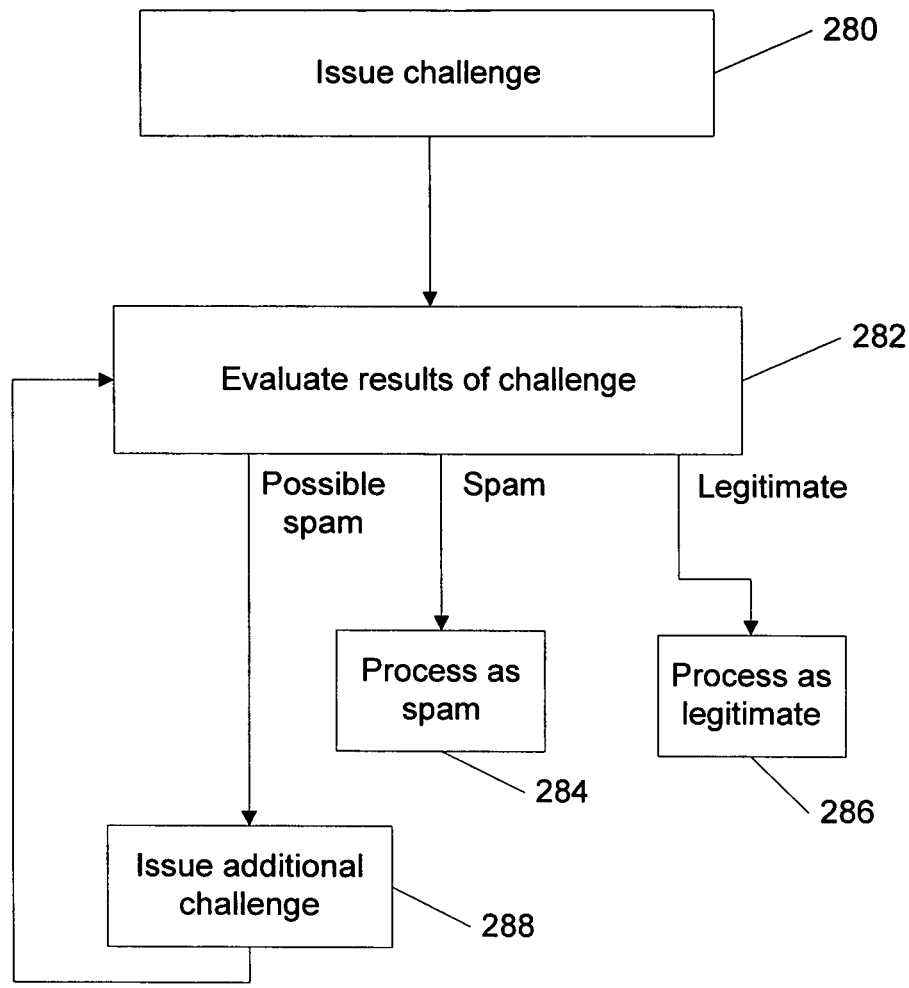
FIG. 20 is a flow diagram of a method for issuing one or more additional challenges based on the results of a challenge according to some embodiments.

FIG. 20 is a flow diagram of a method for issuing one or more additional challenges based on the results of a challenge according to some embodiments. In this example, at step 280, a challenge may be issued. The results of the challenge may be evaluated at step 282 (e.g., by determining whether the challenge bounced or whether the sender responded to the challenge with a satisfactory response, etc.) If a satisfactory response to the challenge is received, the original message from the sender may be processed as legitimate at step 286. One example of processing a message as legitimate is to deliver it. Another example of processing a message as legitimate is to deliver all pending original messages from the same sender. If the response to the challenge, or lack thereof, indicates the message is spam, the message may be processed as spam at step 284. One example of processing the message as spam is to quarantine or delete it. Another example of processing the message as spam is to quarantine or delete all pending original messages from the same sender. If there is uncertainty as to whether or not the message is spam, the recipient can issue an additional challenge message at step 288. The additional challenge may be a duplicate of the initial challenge or may be a new challenge. The recipient can evaluate the results of the additional challenge at step 282. A global time limit or other suitable criteria may be used to terminate the process of FIG. 20 (e.g., by concluding that the message is spam or legitimate according to suitable predefined or user-defined rules).

Figure 21:
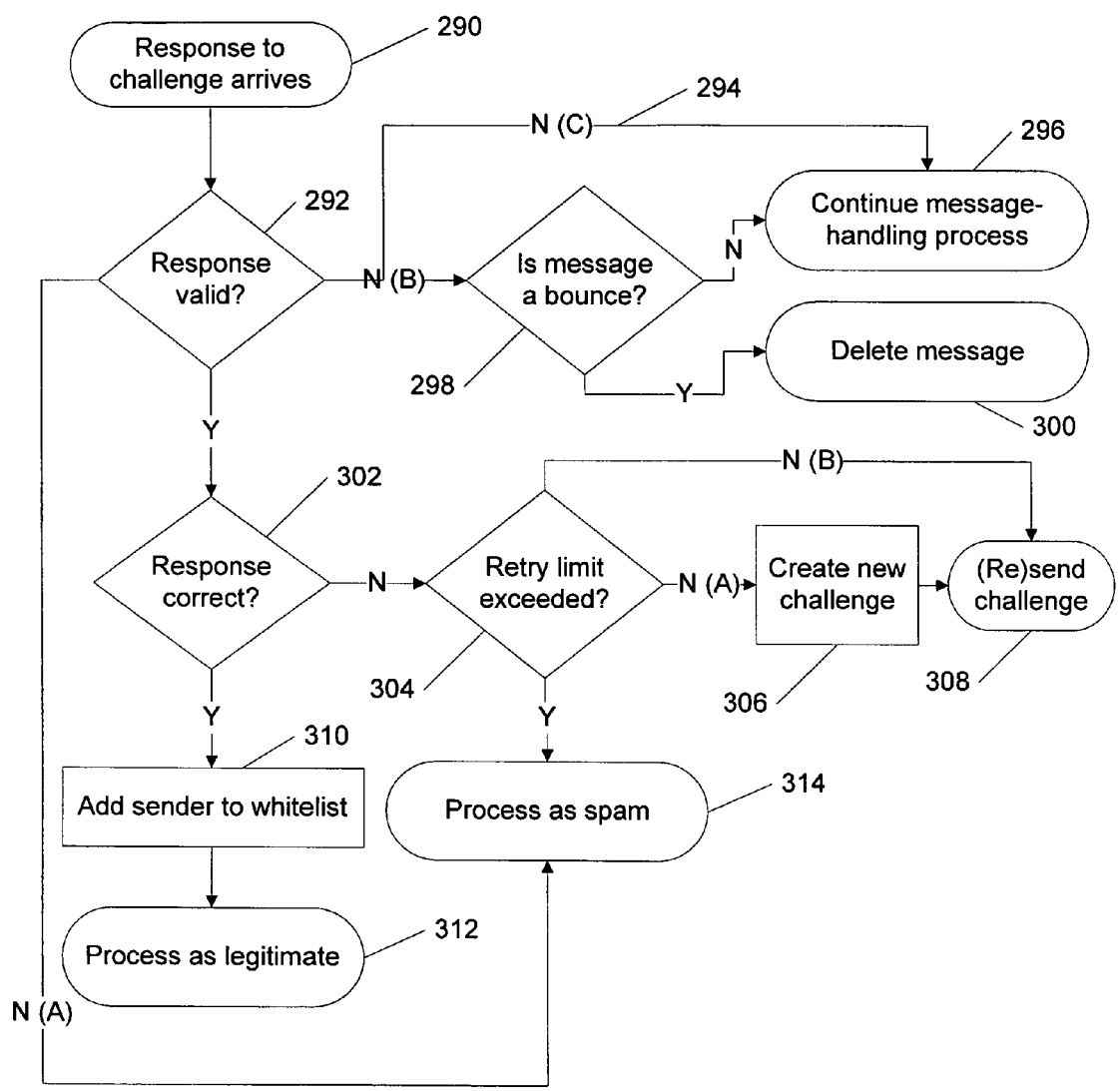
FIG. 21 is another flow diagram of a method for issuing one or more additional challenges based on the results of a challenge according to some embodiments.

FIG. 21 is another flow diagram of a method for issuing one or more additional challenges based on the results of a challenge according to some embodiments. In this example, a response to a challenge arrives at step 290. At step 292, it is determined whether the response is valid (e.g., whether the response is a response to a challenge that had been issued, for example by determining that the response contains a message ID corresponding to a valid challenge). With one embodiment, an invalid response results in continued message-handling processes at step 296 (e.g., content-based anti-spam classification, etc.), as indicated by line 294. This is merely an illustrative response to identifying an invalid response. For example, with another embodiment, receipt of an invalid response can result in processing the message as spam at step 314. With yet another suitable embodiment, when it is determined that the response is not valid at step 292, the recipient evaluates the type of response that has been received at step 298. If the response message is identified as a bounce of the challenge, the original message can be deleted at step 300. If the response message is identified as not being a bounce (with this embodiment), continued message-handling processes may be performed at step 296.

If, at step 292, it is determined that the response message is a valid response, the recipient may determine whether the response message contains a correct solution to the challenge at step 302. If, for example, the challenge included a captcha, step 302 may involve comparing the captcha answer provided to encrypted captcha answer information in the response (as an example), or to a stored answer. If, for example, the challenge included a computational puzzle, step 302 may involve determining whether the answer fulfills encoded puzzle specifications or answer such as included in challenge identifier 250, or stored puzzle specifications or answer.

If the response is not correct, it may be determined whether another challenge should be sent. One example of determining whether another challenge should be sent is to check whether a challenge retry limit has been exceeded at step 304. A retry limit may be predefined or user-defined and may be any suitable numerical, time-valued, or hybrid (numeric/time-valued) limit value or any other suitable limit. With one suitable approach, if the retry limit has not been exceeded, the original challenge may be resent at step 308. Alternatively, a new challenge can be created at step 306 and this new challenge sent to the sender at step 308. In some embodiments, a new challenge may have a similar degree of difficulty than an original challenge. In other embodiments, a new challenge may have a different degree of difficulty than an original challenge. For example, a new challenge may be more difficult.

If the response is not correct, but the retry limit has been exceeded, the message may be treated as spam at step 314. Any suitable approach may be used to process spam messages at step 314. One example of treating the message as spam is to quarantine or delete the message. Another example of treating the message as spam is to quarantine or delete all retained messages from the same sender.

If, at step 302, it is determined that the response to the challenge is correct, it may be concluded that the message is legitimate. Accordingly, the sender may be optionally added to the recipient's whitelist 30 at step 310. Any suitable criteria may be used when adding a sender to the whitelist (e.g., the sender's email address may be entered in the whitelist, etc.).

At step 312, the original message may be processed as legitimate. Any suitable approach may then be used to process legitimate messages at step 312. One example of treating the message as legitimate is to deliver the message (e.g., by placing that message in the recipient's inbox). Another example of treating the message as legitimate is to deliver all messages from the same sender.

Figure 21A:
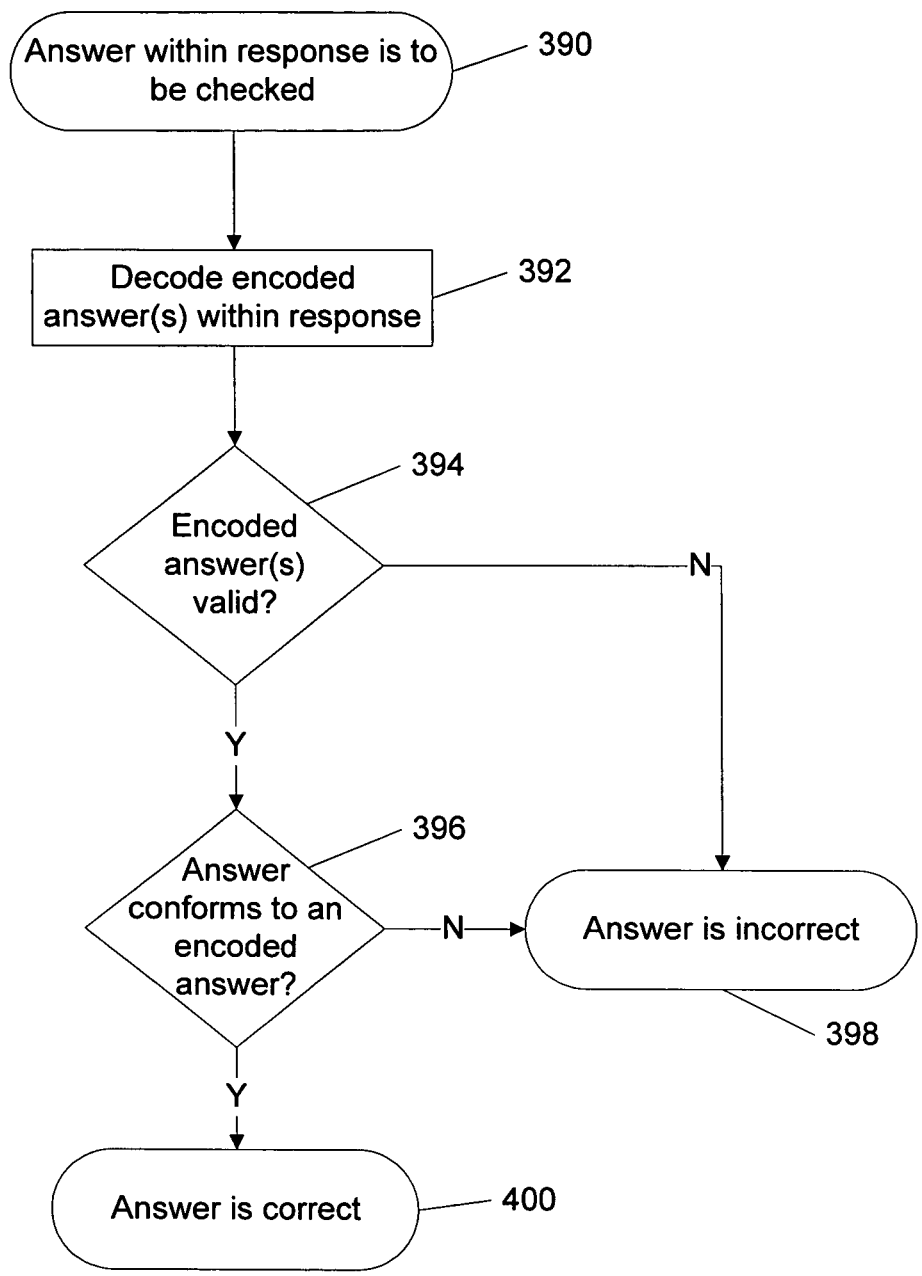
FIG. 21A is a flow diagram of a method for determining whether an answer contained in a response is correct according to some embodiments.

FIG. 21A is a flow diagram of a method for determining whether an answer contained in a response is correct according to some embodiments. This may, for example be performed as step 302 of FIG. 21 or step 274 of FIG. 19.

In this example, an answer to a puzzle contained with a response is to be checked at step 390. The answer may be an answer to a captcha or a computational puzzle. One or more encoded answers within the response may be decoded in step 392. An example of decoding an encoded answer is to decrypt the encoded answer using a secret key. An example of an encoded answer is provided in encoded answer 244 of FIG. 17.

At step 394, it may optionally be determined whether the encoded answer(s) are valid. An example of determining whether an encoded answer is valid is to extract an associated piece of characteristic information, such as an original message ID or a hash of original message contents, and compare the extracted characteristic information with the baseline information, such as the original message. If the extracted characteristic information does not match the baseline information, then the answer may be considered incorrect in step 398.

If the extracted characteristic information matches the baseline information, then the answer provided in the response may be compared to the encoded answer(s) in step 396. If the answer provided in the response matches an encoded answer, then the answer may be considered correct in step 400. If the answer provided in the response does not match an encoded answer, then the answer may be considered incorrect in step 398.

Figure 21B:
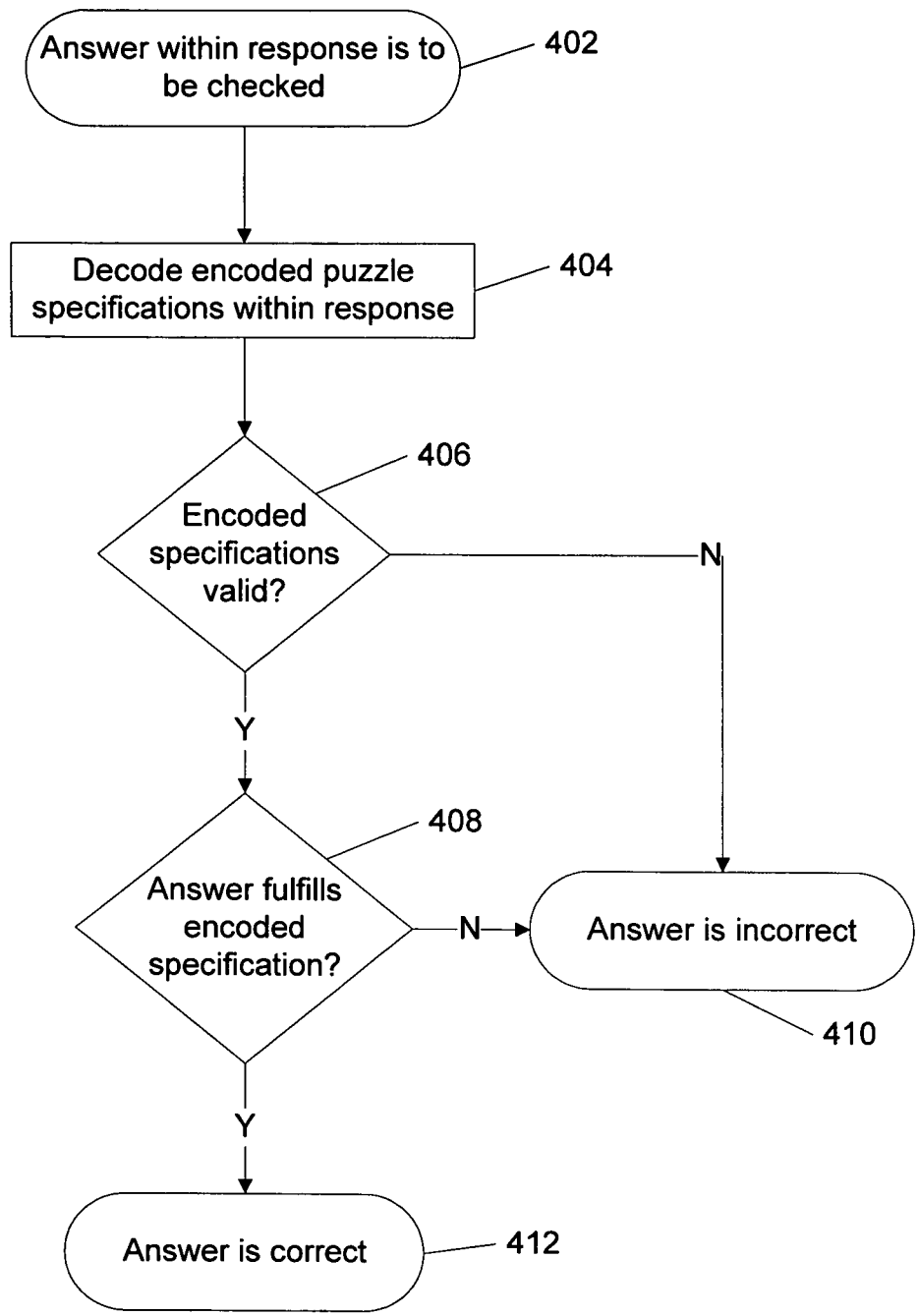
FIG. 21B is a flow diagram of a method for determining whether an answer contained in a response is correct according to some embodiments.

FIG. 21B is a flow diagram of a method for determining whether an answer contained in a response is correct according to some embodiments. This may, for example be performed as step 302 of FIG. 21 or step 274 of FIG. 19.

In this example, an answer to a puzzle contained with a response is to be checked at step 402. The answer may be an answer to a captcha or a computational puzzle. One or more encoded puzzle specifications within the response may be decoded in step 404. An example of decoding an encoded answer is to decrypt the encoded answer using a secret key. An example of puzzle specifications and encoded puzzle specifications is illustrated in challenge identifier 250 of FIG. 17.

At step 406, it may optionally be determined whether the encoded specifications are valid. An example of determining whether encoded specifications are valid is to extract an associated piece of characteristic information, such as an original message ID or a hash of original message contents, and compare the extracted characteristic information with the baseline information, such as the original message. If the extracted characteristic information does not match the baseline information, then the answer may be considered incorrect in step 410.

If the extracted characteristic information matches the baseline information, then the answer provided in the response may be checked to determine whether it fulfills the specifications in step 408. An example of checking to determine whether an answer fulfills specifications is to compute a taxation function with the answer as an argument, and determine whether the result meets the specifications. If the answer provided in the response fulfills the specifications, then the answer may be considered correct in step 412. If the answer provided in the response does not fulfill the specifications, then the answer may be considered incorrect in step 410.

Figure 22:
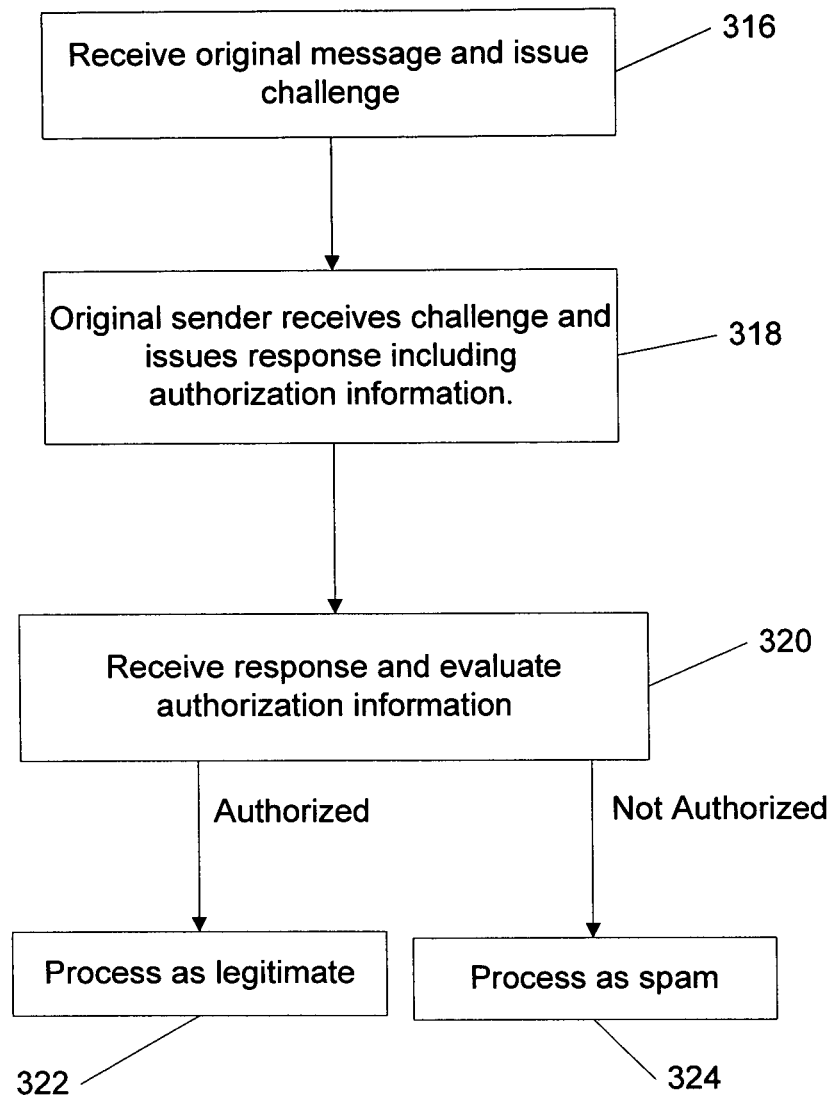
FIG. 22 is a flow diagram of a method for using authorization information in response message processing according to some embodiments.

If desired, certain senders may be allowed to respond to challenges to their messages without solving a puzzle. Any suitable technique may be used to allow senders to bypass computational puzzles. FIG. 22 is a flow diagram of a method for using authorization information in response message processing according to some embodiments. In this example, at step 316, an original message is received and a corresponding challenge is issued. The challenge may, for example, be issued automatically and may include a computational puzzle.

At step 318, the challenge may be received and a response may be issued. The response can include authorization information that indicates that the sender is authorized to send a message to the recipient. Any suitable authorization information may be used, such as a token, digital signature, digital certificate, encrypted information, etc. These types of authorization information need not be mutually exclusive. Moreover, more than one of these approaches may be used if desired.

At step 320, the response may be received and authorization information may be evaluated. For example, if the authorization information involves a digital signature, the recipient can use a signature verification algorithm to verify that the digital signature is authentic (as an example). In some embodiments, a digital signature may be evaluated based on authorization(s), for example one or more trusted authorities supporting the authentication of the signature.

If the recipient determines that the sender is authorized, the original message from the sender can be processed by the recipient as legitimate at step 322. If the recipient determines that the sender is not authorized, the original message may be processed as spam at step 324. Any suitable techniques may be used to process legitimate and spam messages. For example, legitimate messages may be placed in the recipient's inbox and spam messages may be quarantined or deleted.

Figure 23:
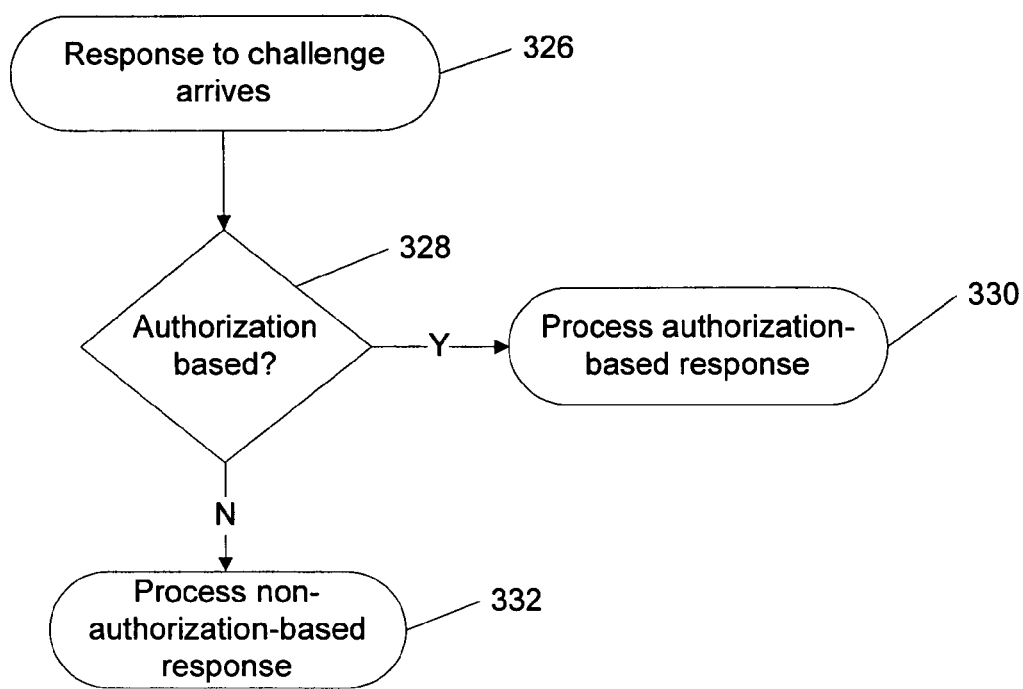
FIG. 23 is a flow diagram of a method for using authorization information such as a digital certificate when processing responses according to some embodiments.

The arrangement of FIG. 22 is merely illustrative. Any suitable arrangement may be used to allow authorized parties to bypass computational puzzles in challenges. FIG. 23 is a flow diagram of a method for using authorization information such as a digital certificate when processing responses according to some embodiments.

In this example, at step 326, a response to a challenge arrives. At step 328, it may be determined whether the response is authorization based. Any suitable technique may be used to determine whether the response is authorization based. For example, header information in the response may be examined to determine whether the response is labeled with a tag or contains a certificate, digital signature, or other authorization information indicating that the response is authorization based.

If it is determined that the response is not authorization based, the response may be processed as a non-authorization-based response at step 332. Any suitable operations may be used at step 332 to process the response. For example, the response processing operations of FIG. 21 may be used to process the response at step 332.

If it is determined at step 328 that the response is authorization based, authorization-based response-processing operations may be performed by the recipient at step 330.

Figure 24:
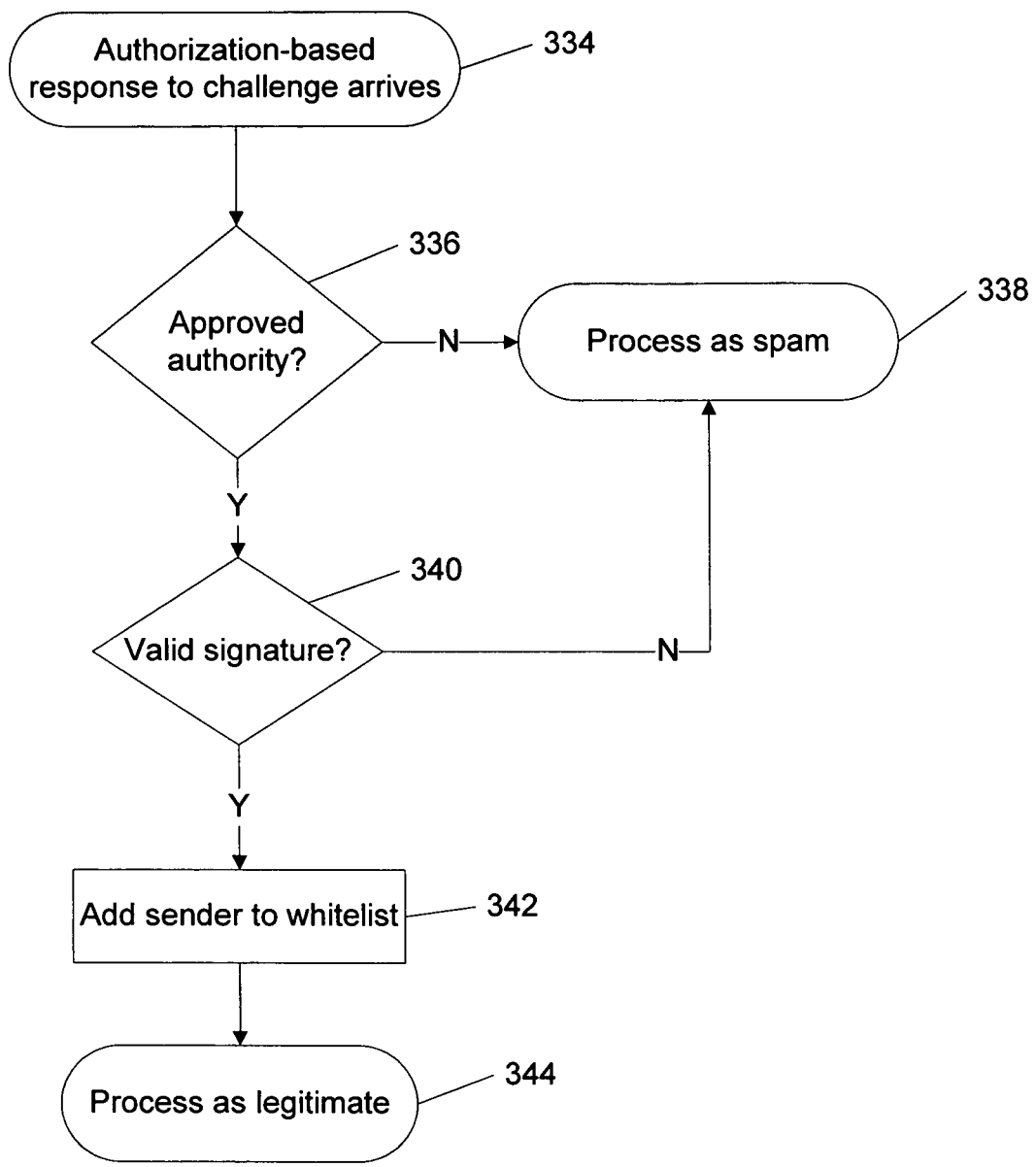
FIG. 24 is a flow diagram of a method for processing authorization-based responses according to some embodiments.

FIG. 24 is a flow diagram of a method for processing authorization-based responses according to some embodiments. In this example, at step 334, a response to a challenge is received.

At step 336, it is determined whether the response message has an associated approved authority. An authority may be any entity with rights to authorize messages. If desired, certain authorities may be allowed to authorize their own messages and/or messages of affiliates. Affiliates may prove that they have been granted the authority to send messages to the recipient by proving that they or their messages have been authorized by an appropriate authority. The identity of an authority may be provided using a certificate, using a digital signature, using a token or tag, using encrypted information, or using any other suitable authority identity information. The identity of an authority may be separate from information used to authenticate the authority or may be the same as all or part of information used to authenticate the authority. Any suitable arrangement may be used to verify authenticity. For example, each response message may be provided with a digital signature of a trusted authority or authorization information may be provided in the form of a digital certificate such as an X.509 certificate signed by a certificate authority. In another example, authorized keys for use in verifying digital signatures may be maintained on a whitelist, for example in conjunction with an indication of whether they are certifying authorities as well as (or instead of) authorized senders. If desired, a chain of authorization may be established (e.g., using cascaded digital certificates and/or digital signatures), so that a given authority can delegate authority to multiple affiliates. In some embodiments, an authority may delegate its full authorization powers, for example the ability to authorize affiliates. In some embodiments, an authority may delegate only selective authorization powers, for example the ability to send messages, but not to authorize additional affiliates.

If the response message does not have an associated approved authority, the original message may be processed as spam at step 338. For example, the original message (and, if desired, other messages from the same sender that have been retained) may be quarantined or deleted.

If, at step 336, it is determined that the response message has an approved authority, a signature or other authorization information may be verified. For example, a cryptographic signature such as an S/MIME signature may be checked to determine whether it is a valid signature for the message.

If the signature (or other authorization information) is determined to be invalid at step 340, the recipient can process the original message (and, if desired, related messages being retained) as spam at step 338.

If the recipient determines that the signature (or other authorization information associated with the response) is valid at step 340, the sender can optionally be added to a whitelist 30 at step 342. The original message may then be processed as legitimate at step 344. For example, the original message may be processed as legitimate by placing the original message in the recipient's inbox for viewing. If messages for which responses have not yet been received are being retained, all messages from that sender may, if desired, be released at step 344.

As described above (e.g., in connection with steps 312 and 314 of FIG. 21 and steps 338 and 344 of FIG. 24), it may sometimes be desirable to hold messages for which responses have not yet been received in a pool of messages pending responses and, when a successful response to a challenge is received, releasing all messages from the same sender.

Figure 25:
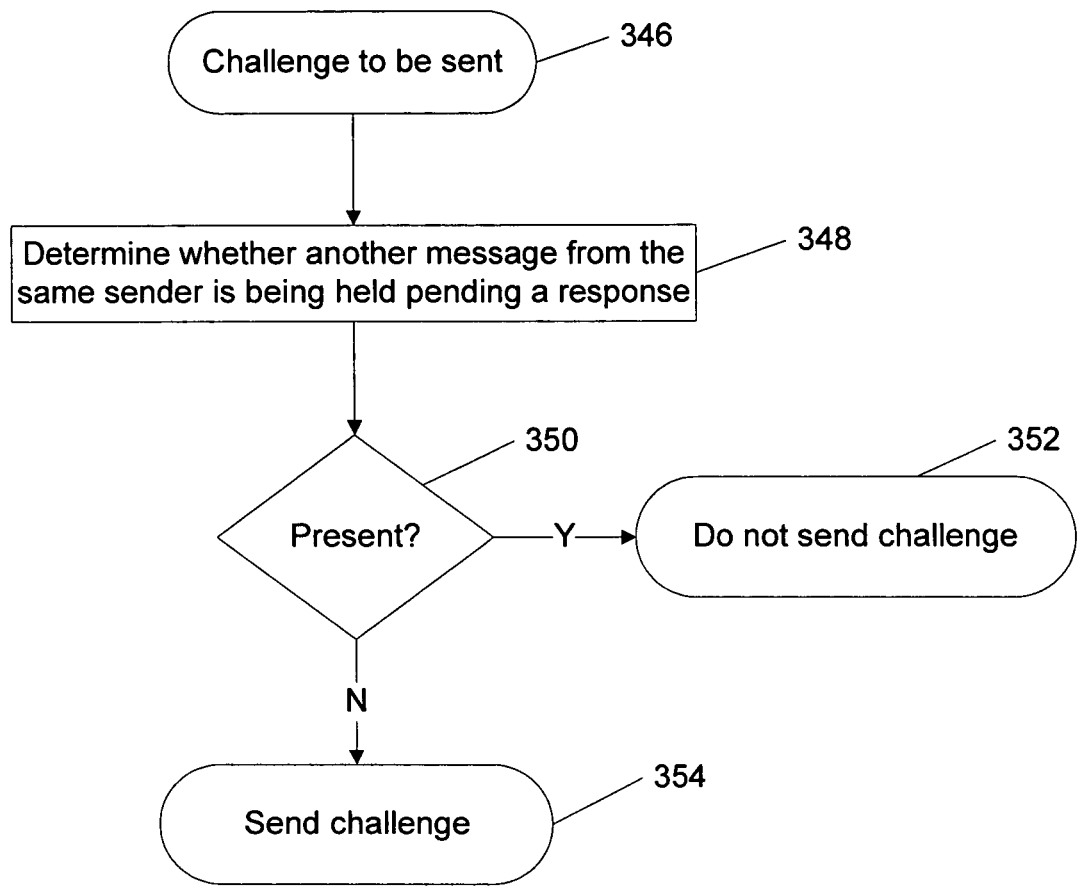
FIG. 25 is a flow diagram of a method for an optional process for queuing messages from a given sender according to some embodiments.

FIG. 25 is a flow diagram of a method for an optional process for queuing messages from a given sender according to some embodiments. The scheme of FIG. 25 is optional and need not be used. For example, the scheme of FIG. 25 need not be used if it is desired to issue a challenge and process a corresponding response for each received original message, regardless of sender.

In this example, after an original message has been received, the process of determining whether to issue a challenge is initiated at step 346.

At step 348 and test 350, the original message may be examined to determine whether another message from the same sender is in a pool of messages pending responses. In some embodiments, a pool of messages pending response may include messages for a single recipient. In some embodiments, a pool of messages pending response may include messages for multiple recipients. For example, step 348 and test 350 may be performed by an entity responsible for multiple recipients, for example a messaging server at an ISP or a corporate messaging server.

If it is determined that there is another retained message from the same sender, the message may be held in the pool of messages pending responses, for example without issuing another challenge (step 352).

If it is determined that there is not a retained message from the same sender, a challenge may be sent to the sender at step 354. If additional messages are received from the same sender before a satisfactory response has been received, these additional messages may be placed in the pending-response pool without sending additional challenges (step 352).

As described in connection with the illustrative message format of FIG. 17, the messages used in communications systems that support challenge-response capabilities may include information such as message identifier information, optional captchas, computational challenges, clickable links, encoded answers to and/or specifications of puzzles, etc.

Figure 26:
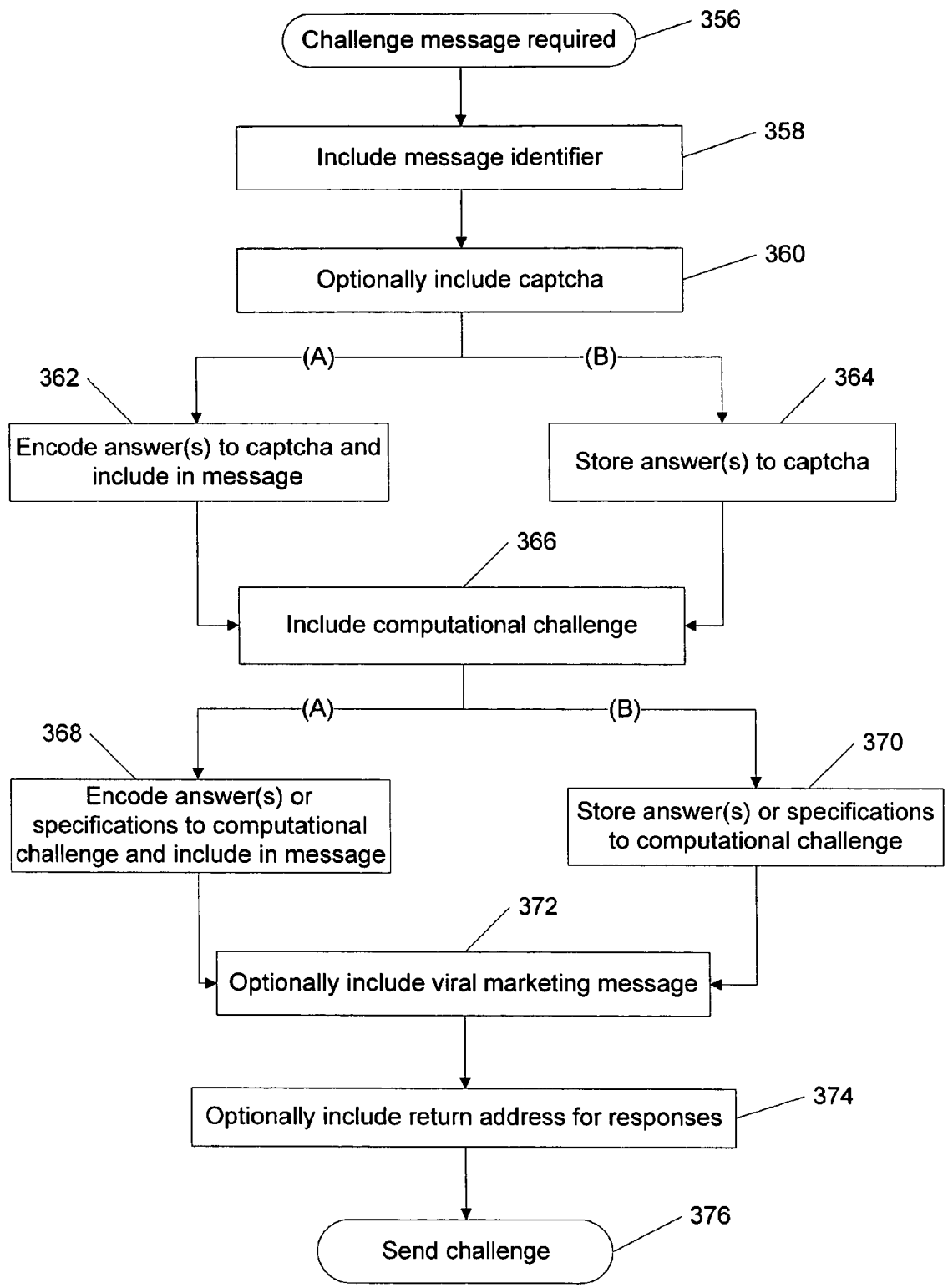
FIG. 26 is a flow diagram of a method for sending a challenge message according to some embodiments.

FIG. 26 is a flow diagram of a method for sending a challenge message according to some embodiments.

In this example, at step 356, a recipient determines that a challenge message is required. Any suitable criteria may be used to determine that a challenge is required. For example, the recipient can challenge incoming messages, can challenge incoming message from senders not on the recipient's whitelist, can challenge incoming messages that appear as though they may be spam after processing by a text classifier, can challenge messages from senders from whom there are no other challenges pending a response, etc.

At step 358, a message identifier may be included in the challenge message. As described in connection with message ID 248 of FIG. 17, original messages may have associated message ID information that allows senders to identify valid replies such as challenges. One example of generating a message ID is to use an existing message ID such as the "Message-ID:" field of an email header. Another example of generating a message ID is to generate a message ID, for example randomly, or sequentially, or an encrypted sequential ID, or any of the previous IDs augmented with a keyed hash (e.g., concatenating an MD5 hash of a secret string plus the random ID with the random ID).

At step 360, a captcha may optionally be included in the challenge message. The captcha may be provided with the challenge message in addition to (or in place of) a computational challenge puzzle. One example of selecting a captcha is to generate one, for example with a distorted rendering of randomly generated text. Another example of selecting a captcha is to select one from among a list of captchas.

If a captcha is provided in the challenge message, one or more acceptable answers may or may not be included in the same challenge message. Step 362 illustrates how a recipient can encode answer(s) to the captcha (e.g., using a suitable encryption algorithm) and may include encoded (or otherwise obscured) captcha answer(s) in the challenge message. In some embodiments, encoding one or more answers may comprise encrypting the answers, for example using a symmetric encryption algorithm, or providing a keyed hash of the answer, for example using MD5 to hash the answer with a secret string. In some embodiments, identifying information such as a message ID or a hash of a message being challenged may be included in an encoded answer. Step 364 illustrates how a recipient can store the answer to the captcha (e.g., locally at the recipient).

A computational puzzle may be included in the challenge message at step 366. Specifications for the puzzle can be encoded and included in the challenge message (step 368) or can be stored (e.g., locally at the recipient) for later retrieval in verifying the challenge solution provided in a response from the sender. One or more encoded answers to the computational puzzle may be included in the challenge if desired. In some embodiments, encoding one or more specifications or answers may comprise encrypting them, for example using a symmetric encryption algorithm. In some embodiments, identifying information such as a message ID or a hash of a message being challenged may be included in an encoded answer or specification. In some embodiments, answer(s) to a puzzle may be hashed along with a predetermined token (for example, using hash functions such as SHA or MD5), and the resulting hash may be stored in the challenge message in a manner that enables a response message to include the hash.

Any suitable arrangement may be used for incorporating one or more encoded specifications or answers in a challenge. Encoded data may for example, be inserted into the header of a message such as an email in a field by itself or along with an interpretable specification of the puzzle. In another example, encoded data may be contained in the subject line of an email message. In some embodiments, a standard element of a message such as the subject line of an email may be contain one or more encoded answers to a captcha, and an element of a message specific to a challenge-response component such as challenge identifier 250 of FIG. 17 may contain one or more encoded answers or specifications to a computational puzzle.

As shown by step 372, a viral marketing message, such as the message and associated clickable link 256 in the illustrative example of FIG. 17, may optionally be included. When a challenge is received, the viral marketing message can provide a way to load appropriate automated response-handling software components, which can facilitate the processing of future challenges.

An optional return address to which responses are to be sent may be included at step 374, as illustrated by the challenge address 251 of FIG. 17. When this type of information is included in a challenge, automatic responses may be directed to an address that the recipient uses for handling response messages. This address may be different than the message address normally used for incoming (non-response) messages. In some embodiments, an address of this type may be included in an original (non-challenge) message to specify an address to which challenges should be sent.

After a challenge message has been generated that includes the desired information (e.g., all or some of the information and features of the illustrative message 238 of FIG. 17), the challenge message may be sent to the sender of the original message at step 376. In some embodiments, a challenge may be send to an alternate challenge address, for example an address provided by the sender of the original message.

A computational puzzle that is included in a challenge (e.g., the computational challenge included at step 366 of FIG. 26) may have a difficulty that is selected or scaled based on suitable criteria (e.g., the characteristics of the original message that is being challenged, external factors such as the current date and time, combinations of these criteria, etc.).

Figure 27:
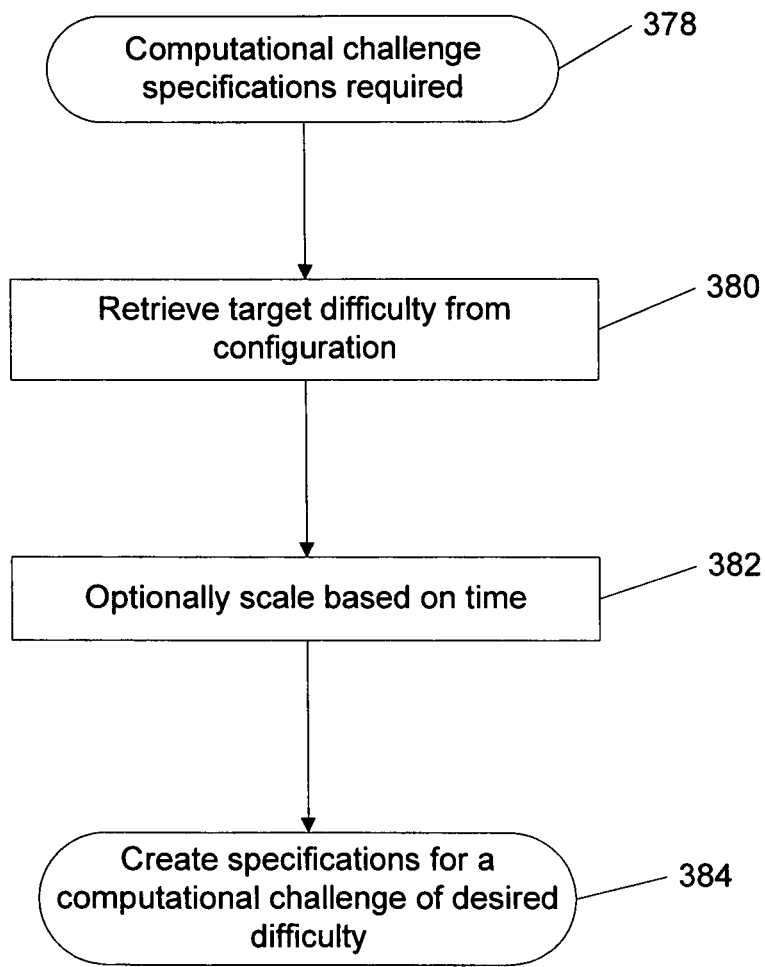
FIG. 27 is a flow diagram of a method for generating a computational challenge message of an appropriate difficulty according to some embodiments.

FIG. 27 is a flow diagram of a method for generating a computational challenge of an appropriate difficulty according to some embodiments.

In this example, it is determined that a challenge is to be generated and that specifications (parameters) defining the nature of the challenge are therefore desired (step 378).

At step 380, a target difficulty may be selected. In some embodiments, configuration settings may be retrieved, for example values established by an anti-spam software vendor and/or configurable by a user or systems administrator. In one example of selecting a target difficulty, output(s) of a message-handling component 24 (FIG. 2), or other information about the incoming message, may be used to define a target difficulty or select a target difficulty from a list of target difficulties. In another example of selecting a target difficulty, responses to challenges may include the amount of time that was required to solve the puzzle. This feedback may be retained and used to select an appropriate difficulty for puzzles. For example, specifications may be selected such that a certain threshold (for example 80%) of recent responders (for example, responders in the most recent six months) are expected to spend less than a certain amount of time (for example five seconds, or a configurable value) solving the puzzle. At step 382, the difficulty level may optionally be scaled to reflect the current date (e.g., by adjusting the target difficulty upward). In one example, difficulty may be approximately doubled every eighteen months. The results of steps 380 and 382 may be used to create specifications for a computational challenge of an appropriate difficulty at step 384. These specifications may be included in the challenge message (e.g., as part of the X-challenge identifier 250 in the example of FIG. 17).

With one suitable arrangement, the difficulty of the puzzle that is used to challenge a message that is suspected of being spam is selected according to the probability that the message being challenged is spam. With this type of approach, the target difficulty selected at step 380 may be based on the likelihood that the original message is spam.

Figure 28:
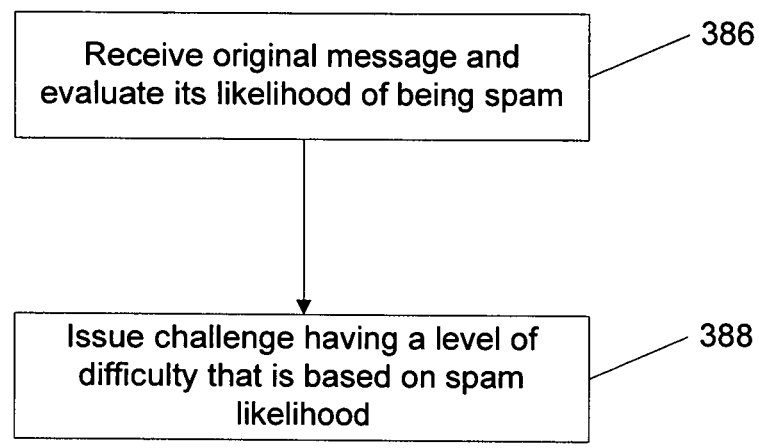
FIG. 28 is a flow diagram of a method for issuing a challenge based on the likelihood that a received message is spam according to some embodiments.

FIG. 28 is a flow diagram of a method for issuing a challenge based on the likelihood that a received message is spam according to some embodiments.

In this example, at step 386, an original message is received and the likelihood that the message is spam is evaluated. Any suitable technique may be used to evaluate whether the message is likely to be spam. For example, a text classifier such as a Bayesian text classifier may be used to create a numeric value that corresponds to an estimated likelihood that the received message is spam. If desired, the likelihood metric may be divided into one of several classifications based on ranges of the metric (for example, 0-50%, 50-75%, 75-90%, 90-100%). This is merely one illustrative arrangement that may be used to classify messages with respect to spam likelihood. Any suitable arrangement may be used if desired.

At step 388, a challenge having a level of difficulty that is based on the likelihood that the original message was spam may be issued. For example, a 50% spam probability may trigger a target solution time of one unit, a 50-75% spam probability may trigger a target solution time of two units, and 75-90% spam probability may trigger a target solution time of three units, and a 90-100% spam probability may trigger a target solution time of four units. A unit may represent an expected amount of time required to solve a puzzle, for example five seconds, or a configurable value.

If spam likelihood was evaluated using classifications that are based on ranges of a likelihood metric, the puzzle may be selected from among a pool of puzzles (or an appropriate puzzle argument may be selected) based on that classification. The likelihood metric that is used to choose the puzzle may be generated by a classifier different than the classifier used to determine that the original message should be challenged. As one example, a support vector machine may be used to classify messages as suspicious or not, and a Bayesian text classifier may be used to determine the likelihood metric that should be used to select an appropriate challenge.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing a message, comprising:
at an electronic computing device, receiving an electronic message via an electronic communications network;
classifying the message into one of a plurality of categories;
wherein the classification includes using content-based message analysis; and
challenging the message when the message is classified into a first category based at least in part on the content-based message analysis, wherein challenging the message includes:
determining a sender;
wherein the sender is associated with the message; and
sending a challenge message to the sender via the electronic communications network, wherein the challenge message includes a specification of a computational puzzle, wherein the computational puzzle includes a taxation function that can be solved to derive an answer to the computational puzzle, and wherein the challenge message includes information relating to a criterion for a satisfactory answer to the computational puzzle, wherein the information relating to the criterion for a satisfactory answer to the computational puzzle is formatted for automated interpretation by a computer.

2. The method of claim 1, wherein the first category is associated with suspicious communications.

3. The method of claim 1, wherein a second category is associated with legitimate communications.

4. The method of claim 3, wherein a third category is associated with spam.

5. The method of claim 1, wherein content-based message analysis includes using a text classifier.

6. The method of claim 5, wherein the text classifier is a Bayesian text classifier.

7. The method of claim 1, wherein classifying the message includes determining a likelihood that the message is associated with spam.

8. The method of claim 7, wherein classifying the message includes comparing the likelihood to a threshold level.

9. The method of claim 8, wherein the message is classified into a second category, wherein the second category is associated with legitimate communications, if it is determined that the likelihood does not exceed the threshold level.

10. The method of claim 8, wherein the message is classified into the first category, if it is determined that the likelihood exceeds the threshold level.

11. The method of claim 8, wherein classifying the message includes comparing the likelihood to a second threshold level, if the likelihood exceeds the threshold level.

12. The method of claim 11, wherein classifying the message includes classifying the message into a third category, wherein the third category is associated with spam, if it is determined that the likelihood exceeds the second threshold level.

13. The method of claim 11, wherein classifying the message includes classifying the message into the first category, if it is determined that the likelihood does not exceed the second threshold.

14. The method of claim 1, wherein the message is an email message.

15. A system for processing a message, comprising:
a processor configured to:
receive an electronic message via an electronic communications network;
classify the message into one of a plurality of categories; wherein the classification includes using content-based message analysis; and
challenging the message when the message is classified into a first category based at least in part on the content-based message analysis, wherein challenging the message includes:
determining a sender;
wherein the sender is associated with the message; and
sending a challenge message to the sender via the electronic communications network, wherein the challenge message includes a specification of a computational puzzle, wherein the computational puzzle includes a taxation function that can be solved to derive an answer to the computational puzzle, and wherein the challenge message includes information relating to a criterion for a satisfactory answer to the computational puzzle, wherein the information relating to the criterion for a satisfactory answer to the computational puzzle is formatted for automated interpretation by a computer; and
a memory coupled with the processor, wherein the memory provides instructions to the processor.

16. A non-transitory computer readable storage medium, comprising a computer program product for processing a message, the computer program product comprising computer instructions for:
at an electronic computing device, receiving an electronic message via an electronic communications network;
classifying the message into one of a plurality of categories;
wherein the classification includes using content-based message analysis; and
challenging the message when the message is classified into a first category based at least on the content-based message analysis, wherein challenging the message includes:
determining a sender;
wherein the sender is associated with the message; and
sending a challenge message to the sender via the electronic communications network, wherein the challenge message includes a specification of a computational puzzle, wherein the computational puzzle includes a taxation function that can be solved to derive an answer to the computational puzzle, and wherein the challenge message includes information relating to a criterion for a satisfactory answer to the computational puzzle, wherein the information relating to the criterion for a satisfactory answer to the computational puzzle is formatted for automated interpretation by a computer.

17. A method for training a content classifier, comprising:
at an electronic computing device, receiving an electronic message via an electronic communications network;
issuing a challenge;
wherein issuing the challenge includes:
    determining a sender;
    wherein the sender is associated with the message; and
    sending a challenge message to the sender via the electronic communications network, wherein the challenge message includes information relating to a criterion for a satisfactory response to the challenge message;
determining a result of the challenge; and
automatically reporting the result of the challenge to a content classifier.

18. The method of claim 17, further comprising using the content classifier to filter spam from incoming messages.

19. The method of claim 17, further comprising reporting to the content classifier whether the challenge message was delivered.

20. The method of claim 17, further comprising reporting to the content classifier whether a response to the challenge message was received.

21. The method of claim 17, further comprising reporting to the content classifier whether a correct response to the challenge message was received.

22. A system for training a content classifier, comprising:
a processor configured to:
    receive an electronic message via an electronic communications network;
    issue a challenge;
    wherein issuing the challenge includes:
        determining a sender;
        wherein the sender is associated with the message; and
        sending a challenge message to the sender via the electronic communications network, wherein the challenge message includes information relating to a criterion for a satisfactory response to the challenge message;
    determine a result of the challenge; and
    automatically report the result of the challenge to a content classifier; and
a memory coupled with the processor, wherein the memory provides instructions to the processor.

23. A non-transitory computer readable storage medium, comprising a computer program product for training a content classifier, the computer program product comprising computer instructions for:
    receiving an electronic message via an electronic communications network;
    issuing a challenge;
    wherein issuing the challenge includes:
        determining a sender;
        wherein the sender is associated with the message; and
        sending a challenge message to the sender via the electronic communications network, wherein the challenge message includes information relating to a criterion for a satisfactory response to the challenge message;
    determining a result of the challenge; and
    automatically reporting the result of the challenge to a content classifier.

* * * * *